United States Patent
Igarashi

(10) Patent No.: US 8,207,997 B2
(45) Date of Patent: Jun. 26, 2012

(54) OPTICAL SCANNING APPARATUS FOR BLOCKING UNDESIRABLE-LIGHT GENERATED IN OPPOSING SCANNING UNITS TO FORM A HIGH QUALITY IMAGE

(75) Inventor: Jun Igarashi, Nikko (JP)

(73) Assignee: Canon Kabushiki Kaisha, Tokyo (JP)

( * ) Notice: Subject to any disclaimer, the term of this patent is extended or adjusted under 35 U.S.C. 154(b) by 441 days.

(21) Appl. No.: 12/436,705

(22) Filed: May 6, 2009

(65) Prior Publication Data

US 2009/0278907 A1  Nov. 12, 2009

(30) Foreign Application Priority Data

May 8, 2008  (JP) .................. 2008-122211

(51) Int. Cl.
  B41J 15/14  (2006.01)
  B41J 2/435  (2006.01)
  B41J 27/00  (2006.01)
  G02B 26/08  (2006.01)
  G02B 26/10  (2006.01)
  G02B 26/12  (2006.01)

(52) U.S. Cl. ........ 347/263; 347/242; 347/245; 347/247; 347/257; 347/261; 359/203.1

(58) Field of Classification Search .................. 347/242, 347/245, 247, 257, 261, 263; 359/203.1
See application file for complete search history.

(56) References Cited

U.S. PATENT DOCUMENTS

| | | | |
|---|---|---|---|
| 6,424,447 B1 * | 7/2002 | Kaneko et al. ............. | 359/216.1 |
| 7,072,087 B2 * | 7/2006 | Nakahata ................... | 359/204.1 |
| 7,136,085 B2 * | 11/2006 | Yoshida ..................... | 347/235 |
| 7,450,146 B2 * | 11/2008 | Sakaue et al. ................ | 347/263 |
| 7,474,451 B2 * | 1/2009 | Yamakawa et al. ........ | 359/216.1 |
| 2006/0187513 A1 * | 8/2006 | Ohsugi ....................... | 359/212 |
| 2006/0285188 A1 * | 12/2006 | Tahk ........................... | 359/216 |
| 2007/0273748 A1 * | 11/2007 | Mamiya ....................... | 347/261 |
| 2008/0298839 A1 * | 12/2008 | Tomioka ..................... | 399/151 |
| 2009/0244670 A1 * | 10/2009 | Sato et al. ................... | 359/205.1 |

FOREIGN PATENT DOCUMENTS

| | | |
|---|---|---|
| JP | 2003-202512 A | 7/2003 |
| JP | 2005-004050 A | 1/2005 |
| JP | 2006-178130 A | 7/2006 |

* cited by examiner

*Primary Examiner* — Laura Martin
*Assistant Examiner* — Jeremy Bishop
(74) *Attorney, Agent, or Firm* — Canon USA Inc. IP Division

(57) ABSTRACT

An optical scanning apparatus effectively blocks undesirable-light generated in opposed scanning units, and forms high-quality image with simple configuration. The apparatus includes two scanning units disposed with a polygon mirror therebetween, each scanning unit including: an incident optical system guiding a beam from a light source to the polygon mirror; and an imaging optical system including an imaging optical element to cause the deflected beam form an image on a scanning surface. One of the scanning units includes a member to block an undesirable light reflected on optical surfaces of the imaging optical element of the other scanning unit and traveling toward the scanning surface of said one scanning unit. rp<L≦A/2 is satisfied, where rp denotes circumcircle radius of polygon mirror; L denotes distance from rotational center of polygon mirror to the blocking member of said one scanning unit, and A denotes length of polygon mirror drive circuit substrate.

6 Claims, 21 Drawing Sheets

FIELD CURVATUR (mm)

DISTORTION (%)  IMAGE HEIGHT MISALIGNMENT (mm)

PARTIAL MAGNIFICATION (%)

UNIFORMITY IN MAGNIFICATION IN SUB-SCANNING DIRECTION (%)

FIELD CURVATUR (mm)

DISTORTION (%)  IMAGE HEIGHT MISALIGNMENT (mm)

PARTIAL MAGNIFICATION (%)

UNIFORMITY IN MAGNIFICATION IN SUB-SCANNING DIRECTION (%)

OPTICAL SCANNING APPARATUS FOR BLOCKING UNDESIRABLE-LIGHT GENERATED IN OPPOSING SCANNING UNITS TO FORM A HIGH QUALITY IMAGE

BACKGROUND OF THE INVENTION

1. Field of the Invention

The present invention relates to an optical scanning apparatus and an image forming apparatus using the same. The present invention is suitable for a color image forming apparatus such as a laser beam printer, a digital copying machine, or a multi-function printer, which adopts an electrophotography process.

2. Description of the Related Art

An image forming apparatus such as a digital copying machine or a laser beam printer (LBP) has conventionally used an optical scanning apparatus for forming an image.

The optical scanning apparatus of this type uses, as a unit for miniaturizing the entire apparatus, opposed scanning units which perform scanning with multiple light beams by means of the same optical deflector, and guides the light beams to different surfaces to be scanned by imaging optical systems disposed on both sides of the optical deflector.

Various optical scanning apparatus that use such opposed scanning units have conventionally been presented (refer to Japanese Patent Application Laid-Open Nos. 2003-202512 and 2005-004050).

Japanese Patent Application Laid-Open Nos. 2003-202512 and 2005-004050 discuss optical scanning apparatus which deflect light beams in symmetrical directions with respect to a shared optical deflector (rotational polygon mirror) for scanning.

FIG. 20 is a main portion schematic diagram of the optical scanning apparatus of Japanese Patent Application Laid-Open No. 2003-202512 shown in FIG. 1. The optical scanning apparatus of the type that share the optical deflector shown in FIG. 20 have the following problem when one optical scanning apparatus (first scanner SK11) forms an image. An undesirable light (ghost light) Rf reflected on a lens surface 91a of a first imaging lens 91 of a first imaging lens system SL11 is transmitted through an imaging lens system SL12 of the other optical scanning apparatus (second scanner SK12) to enter a photosensitive drum surface 99.

Similarly, there exists an undesirable light reflected on a lens surface of a first imaging lens 92 of the second imaging lens system SL12 to enter the first imaging lens system SL11.

Depositing an anti-reflection film on the lens surface enables reduction of undesirable lights. However, in the case of a plastic lens often used recently for reducing weight and costs of the optical scanning apparatus, deposition of an anti-reflection film is difficult. Thus, there is a demand for a method of reducing undesirable lights by using means other than an anti-reflection film.

To easily realize an optical scanning apparatus which forms a four-color image by using one optical deflector, a sub-scanning in-section oblique incident optical system has been employed which obliquely input light beams in a sub-scanning section to a deflecting surface of the optical deflector.

FIG. 21 is a perspective diagram of a main portion around the rotational polygon mirror 201 of Japanese Patent Application Laid-Open No. 2005-004050 shown in FIG. 1.

The opposed scanning units and the sub-scanning in-section oblique incident optical system discussed in Japanese Patent Application Laid-Open No. 2005-004050 include an undesirable-light blocking member 206 disposed to prevent incidence of undesirable lights to imaging optical elements 202a and 202b. Specifically, an undesirable light spatially separated from real light beams for image formation in the sub-scanning section is blocked by using the undesirable-light blocking member 206.

The undesirable-light blocking member 206 prevents reaching of any undesirable lights to the surface to be scanned (not shown).

Recently, in order to miniaturize the optical scanning apparatus, optical elements of the optical scanning apparatus have been densely arranged, resulting in a complicated arrangement. Inadequate assembling accuracy of a box (casing) to mount the optical elements has created a tendency toward lower mounting accuracy of the optical elements.

In order to further miniaturize the optical scanning apparatus, the optical box and the undesirable-light blocking member have been integrally formed.

Typically, an undesirable light enters the undesirable-light blocking member to be blocked. However, if an optical element (optical member) is shifted from a desired position, an undesirable light reflected on a surface of the optical element strays from a predicted optical path. Thus, without entering the undesirable-light blocking member, the undesirable light may reach the surface to be scanned which is located ahead on the optical path. In consequence, during image formation, image defects such as density fluctuations of an image may occur.

In Japanese Patent Application Laid-Open No. 2005-004050, in FIG. 21, for example, it is presumed that a mounting error occurs in the imaging optical element 202b so that the imaging optical element 202b is tilted in the sub-scanning section. In this case, an undesirable light reflected on an incident surface of the imaging optical element 202b passes through an opening 206a of the undesirable-light blocking member 206. The undesirable light that has passed through the opening 206a enters the imaging optical element 202a to reach the surface to be scanned (not shown). As a result, during image formation, image defects such as density fluctuations of an image occur.

When the imaging optical element is disposed in a position near the surface to be scanned, an undesirable light reflected on an incident surface of the imaging optical element passes through the position near an optical reference axis in substantially parallel to the optical reference axis.

Note that the optical reference axis is an axis passing through an incident point to a defecting surface of a principal beam (principal ray) of light beams and vertical to the deflecting surface in the sub-scanning section when the principal beam of the light beams emitted from the incident optical system is deflected on the deflecting surface of the optical deflector enters the center of the surface to be scanned.

Thus, in order to block unexpected fluctuations of an undesirable light or an undesirable light reflected on another optical element, an opening (opening portion) of the undesirable-light blocking member has to be narrowed as much as possible.

However, the excessively narrow opening of the undesirable-light blocking member causes blocking of even a part of real light beams for forming a latent image on the photosensitive drum surface.

SUMMARY OF THE INVENTION

The present invention provides an optical scanning apparatus capable of effectively blocking any undesirable lights generated when opposed scanning units are used and of forming a high-quality image with a simple configuration, and an image forming apparatus using the same.

According to one aspect of the present invention, an optical scanning apparatus comprises:

two scanning units disposed to face each other with a rotational polygon mirror interposed therebetween in a sub-scanning section, each of the two scanning units including:

an incident optical system in which a light beam emitted from a light source is made incident on a deflecting surface of the rotational polygon mirror; and an imaging optical system including an imaging optical element configured to cause the light beam, deflected for scanning on the deflecting surface of the rotational polygon mirror, form an image on a surface to be scanned, wherein the light beam that enters the deflecting surface of the rotational polygon mirror enters obliquely with respect to a normal of the deflecting surface of the rotational polygon mirror in the sub-scanning section, wherein one of the two opposed scanning units includes an undesirable-light blocking member configured to block an undesirable light reflected on an optical surface of the imaging optical element of the other of the two opposed scanning units to travel toward the surface to be scanned of said one of the two opposed scanning units, and wherein the following condition is satisfied:

$$rp < L \leq A/2$$

where rp denotes a circumcircle radius of the rotational polygon mirror, L denotes a distance from a rotational center of the rotational polygon mirror to the undesirable-light blocking member of the one scanning unit in a direction of an optical axis of the imaging optical system, and A denotes a length of a drive circuit substrate for driving the rotational polygon mirror in the direction of the optical axis of the imaging optical system.

According to a further aspect of the present invention, in the optical scanning apparatus, the undesirable-light blocking member is integrally formed with an optical box in which the drive circuit substrate is fixed.

According to a further aspect of the present invention, in the optical scanning apparatus, each of the two opposed scanning units includes two stations, and a light beam emitted from a light source of each of the two stations enters obliquely with respect to the normal of the deflecting surface of the rotational polygon mirror in the sub-scanning section.

According to a further aspect of the present invention, in the optical scanning apparatus, the light beams emitted from the light sources of the two stations enter to the same deflecting surface of the rotational polygon mirror in the sub-scanning section.

According to a further aspect of the present invention, in the optical scanning apparatus, the light beams deflected for scanning on the same deflecting surface of the rotational polygon mirror pass through the imaging optical element shared by the two stations.

According to a further aspect of the present invention, in the optical scanning apparatus:

said the other of the two opposed scanning units includes an undesirable-light blocking member configured to block an undesirable light reflected on an optical surface of the imaging optical element of said one of the two opposed scanning units to travel toward a surface to be scanned of said the other of the two opposed scanning units;

the following condition is satisfied:

$$A/2 < L'$$

where L' denotes a distance from the rotational center of the rotational polygon mirror to the undesirable-light blocking member of said the other of the two opposed scanning units in the direction of the optical axis of the imaging optical system, and an opening width of the undesirable-light blocking member of said one of the two opposed scanning units in a sub-scanning direction is narrower than an opening width of the undesirable-light blocking member of said the other of the two opposed scanning units in the sub-scanning direction.

According to another aspect of the present invention, an image forming apparatus comprises:

the optical scanning apparatus set out in the foregoing;

a photosensitive member disposed on a surface to be scanned;

a developing device configured to develop an electrostatic latent image formed on the photosensitive member by scanning with a light beam by the optical scanning apparatus as a toner image;

a transferring device configured to transfer the developed toner image to a transfer material; and a fixing device configured to fix the transferred toner image on the transfer material.

According to another aspect of the present invention, an image forming apparatus comprises:

the optical scanning apparatus set out in the foregoing; and a printer controller configured to convert code data input from an external device into an image signal, and to input the converted image signal to the optical scanning apparatus.

The present invention can achieve the optical scanning apparatus capable of effectively blocking any undesirable lights generated when opposed scanning units are used, and of forming a high-quality image with a simple configuration, and the image forming apparatus using the same.

Further features of the present invention will become apparent from the following description of exemplary embodiments with reference to the attached drawings.

DESCRIPTION OF THE EMBODIMENT

Exemplary embodiments of the present invention are described below with reference to the drawings.

First Embodiment

Figure 1:
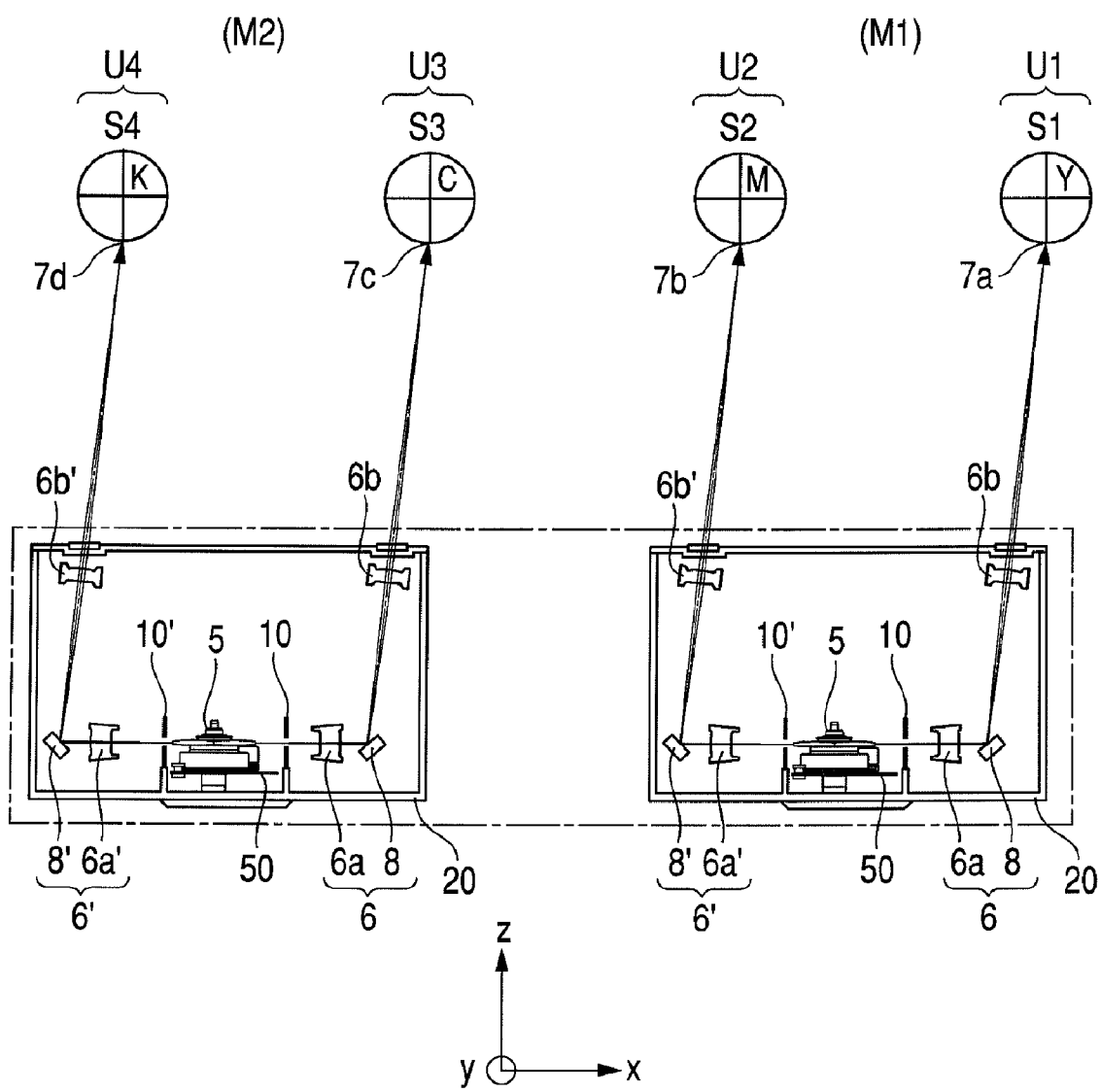
FIG. 1 is a sub-scanning sectional diagram of an optical scanning apparatus according to a first embodiment of the present invention.

FIG. 1 is a main portion sectional diagram of a sub-scanning direction (sub-scanning sectional diagram) according to a first embodiment of the present invention.

In the description below, the sub-scanning direction (Z direction) is a direction parallel to a rotational axis of a deflection unit.

A main-scanning section is a section whose normal is the sub-scanning direction (direction parallel to the rotational axis of the deflection unit).

A main scanning direction (Y direction) is a direction where light beams deflected for scanning by the deflection unit are projected on the main-scanning section.

A sub-scanning section is a section whose normal is the main scanning direction.

An optical reference axis C0 is an axis passing through an incident point to a deflecting surface of a principal light beam (principal ray) of light beam and vertical to the deflecting surface in the sub-scanning section when the principal light beam of light beam emitted from an incident optical system is deflected for scanning on the deflecting surface of an optical deflector to enter a center of a surface to be scanned.

FIG. 1 illustrates first and second optical scanning apparatus M1 and M2.

In this embodiment, as illustrated in FIG. 1, disposing the two optical scanning apparatus M1 and M2 in parallel configures a color image forming apparatus which forms a color image from four-color (Y, M, C, and K) images.

The first optical scanning apparatus M1 includes two scanning units U1 and U2 disposed to face each other with an optical deflector (rotational polygon minor) 5 interposed therebetween. The second optical scanning apparatus M2 includes two scanning units U3 and U4 disposed to face each other with an optical deflector 5 interposed therebetween.

The first scanning unit U1 includes a first station S1 for yellow (Y), and the second scanning unit U2 includes a second station S2 for magenta (M). The third scanning unit U3 includes a third station S3 for cyan (C), and the fourth scanning unit U4 includes a fourth station S4 for black (K).

The first and second optical scanning apparatus M1 and M2 are similar in configuration and optical operation. Thus, the first optical scanning apparatus M1 is mainly described. Members of the second optical scanning apparatus M2 similar to those of the first optical scanning apparatus M1 are denoted by similar reference numerals, and each member of the second optical scanning apparatus M2 is described when necessary.

In the first optical scanning apparatus M1, the first and second stations S1 and S2 are similar in configuration and optical operation. Thus, the first station S1 is mainly described. Members of the second station S2 similar to those of the first station S1 are bracketed. Each member of the second station S2 is described when necessary.

The rotational polygon mirror (optical deflector) 5 serving as a deflecting unit is rotated at a constant speed by a driving unit (not shown) such as a motor, and shared by the first and second (third and fourth) two stations S1 and S2 (S3 and S4).

An imaging optical system 6 (6') includes a first imaging lens (scanning lens) 6a (6a') serving as a first imaging optical element made of plastic material and a second imaging lens (scanning lens) 6b (6b') serving as a second imaging optical element made of plastic material. The imaging optical system 6 (6') may include three or more imaging optical elements.

The imaging optical system 6 (6') forms a spot-image, on a photosensitive drum surface 7a (7b) which is a surface to be scanned (described later) in a main scanning section, of the light beam based on image information and deflected for scanning by the rotational polygon mirror 5. The deflecting surface of the rotational polygon mirror 5 and the photosensitive drum surface 7a (7b) are configured to have an optical conjugate relationship therebetween in the sub-scanning section, to thereby provide an optical face tangle error correction function.

Photosensitive drums 7a to 7d serving as recording media are photosensitive drums (surfaces to be scanned) for Y (yellow), M (magenta), C (cyan), and K (black) colors, respectively.

A reflection mirror 8 (8') serving as a reflecting member includes a plane mirror, and turns back a light beam having passed through the first imaging lens 6a (6a') to the second imaging lens 6b (6b'). The reflection mirror 8 (8') may have power in the main-scanning section or the sub-scanning section.

An undesirable-light blocking member 10 (10') blocks an undesirable light (reflected light) reflected on an imaging lens surface (optical surface) of the second (first) station S2 (S1), and is disposed between the rotational polygon mirror 5 and the first imaging lens 6a (6a'). The undesirable-light blocking member 10 (10') is disposed away in the sub-scanning direction from an optical path of a scanning light beam deflected for scanning on the deflecting surface of the rotational polygon mirror 5 to enter the surface 7a (7b) to be scanned.

In this embodiment, the undesirable-light blocking members 10 and 10' are disposed in both sides of the rotational polygon mirror 5 interposed therebetween, and formed integrally with an optical box 20 for housing the rotational polygon mirror 5 and the first and second imaging lenses 6a and 6b.

The undesirable-light blocking member 10 and 10' are formed integrally with an optical box to which a drive circuit substrate 50 is fixed.

The undesirable light is a light beam reflected on the surface of the imaging optical element of the imaging optical system in one scanning unit to enter the imaging optical system in the other scanning unit oppositely disposed with the rotational polygon mirror 5 interposed therebetween, thereby entering the surface to be scanned in the other scanning unit. The undesirable-light blocking member 10 (10') includes a light blocking member having an opening or two light blocking members divided in the sub-scanning direction.

The drive circuit substrate 50 rotates and drives the rotational polygon mirror 5.

Figure 2:
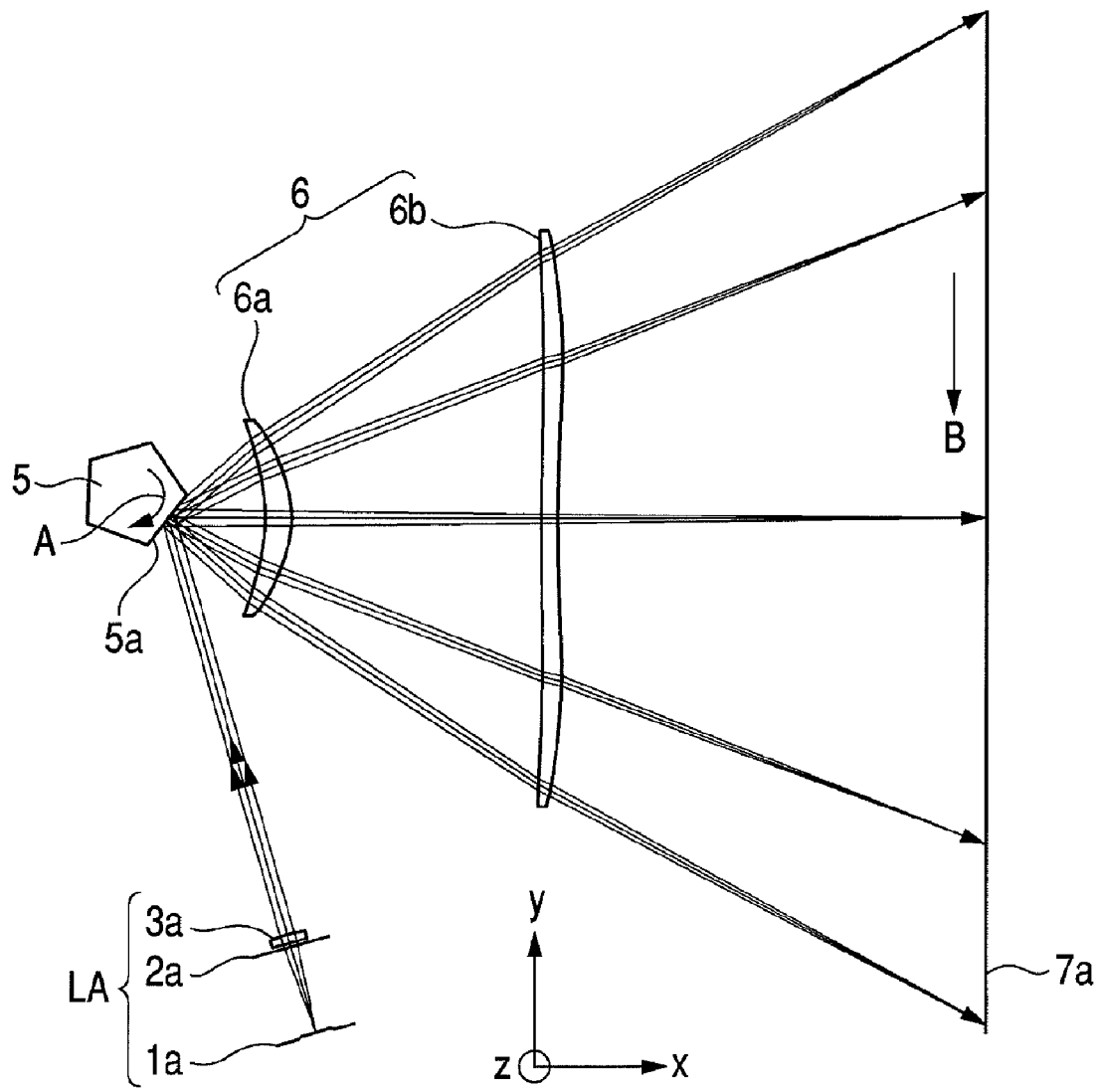
FIG. 2 is a main-scanning sectional diagram of the optical scanning apparatus according to the first embodiment of the present invention.
Figure 3A:
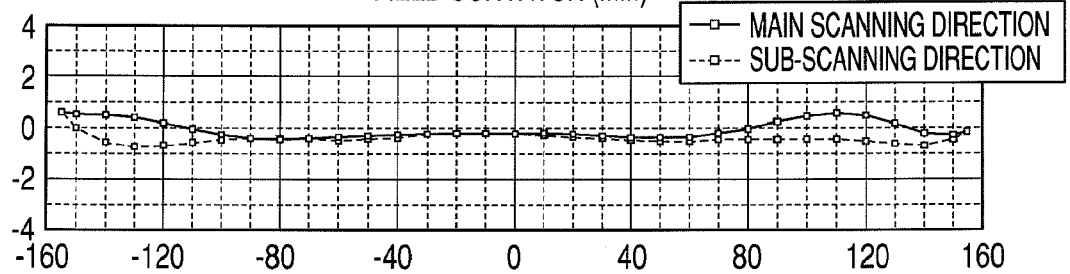
FIGS. 3A, 3B, 3C and 3D illustrate geometrical aberrations and uniformity in magnification in a sub-scanning direction according to the first embodiment of the present invention.
Figure 3B:
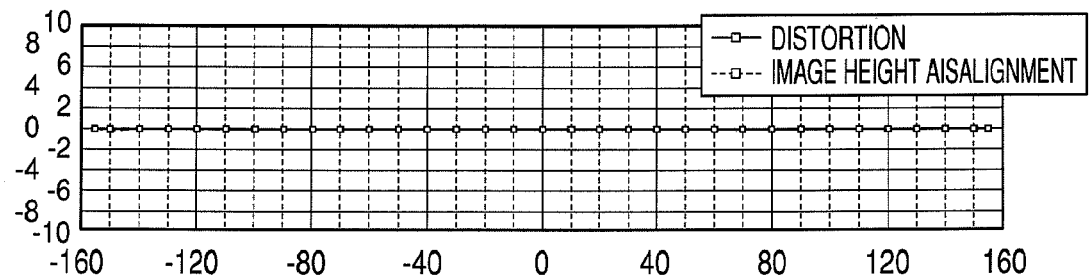
Figure 3C:
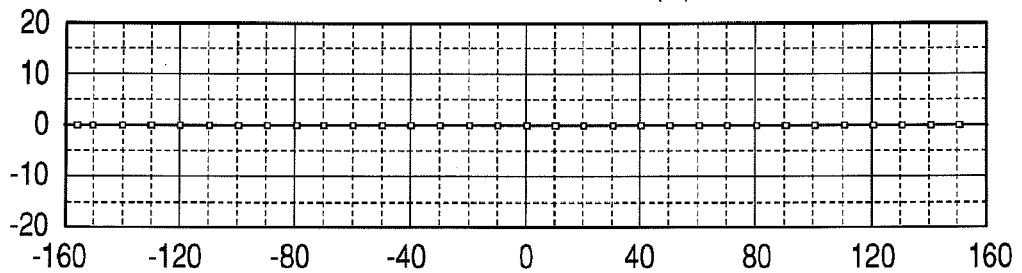
Figure 3D:
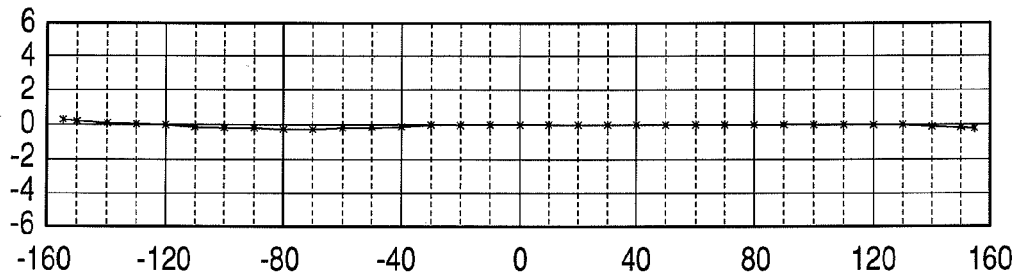

FIG. 2 is a main portion sectional diagram in the main scanning direction (main-scanning sectional diagram), of the first station S1 of the first optical scanning apparatus M1 shown in FIG. 1, illustrating a spread-out optical path. In FIG. 2, the undesirable-light blocking member and the reflection mirror shown in FIG. 1 are omitted.

FIG. 2 illustrates only the station S1 of the optical scanning apparatus M1. The station S2 of the optical scanning apparatus M1, and the stations S3 and S4 of the optical scanning apparatus M2 are similar in configuration and optical operation to the station S1.

In FIG. 2, a light source 1a includes a semiconductor laser.

An aperture stop 2a forms a diverged light beam emitted from the light source 1a into a specific beam shape. A condenser lens (anamorphotic lens) 3a has different refractive powers (powers) between the main scanning direction (in main-scanning section) and the sub-scanning direction (in sub-scanning section). Thus, the diverged light beam having passed through the aperture stop 2a is converted into a parallel light beam (or converged light beam) in the main scanning direction, and into a converged light beam in the sub-scanning direction.

The aperture stop 2a and the condenser lens 3a constitute an incident optical system LA as one of the elements thereof. The incident optical system LA guides the light beam emitted from the light source 1a to the deflecting surface 5a of the rotational polygon mirror 5.

Two optical elements (collimator lens and cylinder lens) may constitute the condenser lens 3a.

The optical deflector 5 serving as a deflection unit includes a five-surface rotational polygon mirror having a circumcircle of a diameter of 34 mm, and is rotated at a constant speed (constant angular velocity) in a direction indicated by an arrow A of FIG. 2 by a motor as a driving unit (not shown).

In this embodiment, in the main-scanning section, a light beam enters the deflecting surface of the rotational polygon mirror 5 obliquely (at a finite angle) with respect to the normal of the deflecting surface of the rotational polygon mirror 5.

In the sub-scanning section, however, no light beam enters the deflecting surface of the rotational polygon mirror 5 obliquely (at a finite angle) with respect to the normal of the deflecting surface of the rotational polygon mirror 5. That is, in the sub-scanning section, an angle between the light beam entering the deflecting surface of the rotational polygon mirror 5 and the normal of the deflecting surface of the rotational polygon mirror 5 is zero.

The imaging optical system 6 has a condensing function and fθ characteristics described below. In this embodiment, the imaging optical system 6 includes first and second imaging lenses 6a and 6b which are imaging optical elements having different powers between in the main scanning direction (in main-scanning section) and in the sub-scanning direction (in sub-scanning section).

In this embodiment, the first and second imaging lenses 6a and 6b are made of plastic materials, and cause a light beam based on image information and deflected for scanning by the deflecting surface 5a of the rotational polygon mirror 5 to form an image on the photosensitive drum 7a as a surface to be scanned. The deflecting surface 5a of the rotational polygon mirror 5 and the surface of the photosensitive drum 7a are configured to have a conjugate relationship therebetween in the sub-scanning section, so that the first and second imaging lenses 6a and 6b compensate an optical face tangle error of the deflecting surface 5a.

The first imaging lens 6a has positive powers in the main-scanning and sub-scanning sections on its optical axis.

The second imaging lens 6b has a negative power in the main-scanning section and a positive power in the sub-scanning section on its optical axis.

The fθ characteristics mean a relationship where a light beam entering at a field angle (scanning angle) θ forms an image in a poison of $Y=f\times\theta$ on an image plane (surface 7a to be scanned), where Y denotes a height from an optical axis and f denotes a constant. In other words, the fθ characteristics mean characteristics where scanning widths (scanning speeds) scanned per unit field angle are equal on the entire region of the scanning surface. The constant f is called an fθ coefficient. When light beams incident on the imaging optical system 6 are parallel light beams, the constant f is equal in value to a paraxial focal length f of the imaging optical system 6.

The photosensitive drum surface (photosensitive drum) 7a is a surface to be scanned.

In this embodiment, a diverged light beam optically modulated based on the image information and emitted from the light source 1a is regulated by the aperture stop 2a to enter the condenser lens 3a. The light beam made incident on the condenser lens 3a exits therefrom as a parallel light beam in the main-scanning section.

In the sub-scanning section, the light beam is converged to form a line image (line image longitudinal in the main scanning direction) on the deflecting surface 5a of the rotational polygon mirror 5. The light beam deflected for scanning on the deflecting surface 5a of the rotational polygon mirror 5 forms a spot-image on the photosensitive drum surface 7a via the first and second imaging lenses 6a and 6b.

Then, by rotating the rotational polygon mirror 5 in the direction indicated by an arrow A, the photosensitive drum surface 7a is optically scanned in a direction indicated by an arrow B (main scanning direction). Thus, an image is recorded on the photosensitive drum surface 7a serving as a recording medium.

In this embodiment, presuming that a printing width equal to an A3 size (ISO 216) is scanned, an effective scanning width of the surface 7a to be scanned is set to 310 mm to configure an optical system. However, the present invention is not limited to this size, and can deal with larger or smaller sizes.

In this embodiment, shapes of refractive surface of the first and second imaging lenses 6a and 6b are represented by the following expression. Assume that an origin is set at an intersection with an optical axis, the direction of the optical axis is set as an X-axis, an axis orthogonal to the optical axis in the main-scanning section is set as a Y-axis, and an axis orthogonal to the optical axis in the sub-scanning section is set as a Z-axis. In this case, a meridian line direction corresponding to the main scanning direction is expressed by the following expression.

$$X = \frac{Y^2/R}{1 + (1 - (1+K)(Y/R)^2)^{1/2}} + B_4 Y^4 + B_6 Y^6 + B_8 Y^8 + B_{10} Y^{10} \quad (a)$$

where R denotes a curvature radius of the meridian line on the optical axis and K, $B_4$, $B_6$, $B_8$, and $B_{10}$ denote aspherical coefficients.

A sagittal line direction corresponding to the sub-scanning direction (direction including an optical axis, which is orthogonal to the main scanning direction) is expressed by the following expression.

$$S = \frac{Z^2/r'}{1 + (1 - (Z/r')^2)^{1/2}} \quad (b)$$

Here, a curvature radius (sagittal line curvature radius) r' with respect to the sub-scanning direction at a position separated from the optical axis by a distance Y in the main scanning direction is represented by the following expression.

$$r' = r_0 (1 + D_2 Y^2 + D_4 Y^4 + D_6 Y^6 + D_8 Y^8 + D_{10} Y^{10})$$

where $r_0$ denotes the sagittal line curvature radius on the optical axis, and $D_2$, $D_4$, $D_6$, $D_8$, and $D_{10}$ denote coefficients.

The sagittal line curvature radius r' off the optical axis is defined in a plane including a normal of a meridian line at each position and vertical to the main scanning direction. A polynomial expression of the shape expression is represented by a function up to the tenth order. However, a greater or smaller order may by used. As long as an expression representing a surface shape has an equivalent degree of freedom for representing surface, effects of the present invention can be obtained without any problems.

Tables 1 and 2 illustrate an optical arrangement of the optical elements of the scanning system and numerical values of surface shapes of the imaging optical elements (scanning lenses) (imaging lenses) according to the first embodiment. In Table 2, a first surface (R1) is an incident surface of the first imaging lens 6a, a second surface (R2) is an exit surface of the first imaging lens 6a, a third surface (R3) is an incident surface of the second imaging lens, and a fourth surface (R4) is an exit surface of the second imaging lens. E-x means $\times 10^{-x}$.

Aspherical coefficients B4u to B10u and D2u to D10u specify shapes of the lens surface on an opposite side of the light source 1 with respect to optical axis in the main-scanning and sub-scanning sections. Aspherical coefficients B4l to B10l and D2l to D10l specify shapes of the lens surface on the side of the light source 1 with respect to the optical axis in the main-scanning and sub-scanning sections.

In this embodiment, a light beam emitted from the light source 1 enters the deflecting surface 5a of the optical deflector 5 at an angle with respect to the optical axis of the imaging optical system 6 in the main-scanning direction. Thus, the back-and-forth positioning deviation of the deflection surface accompanied by rotation of the optical deflector 5 (sagitta) occurs asymmetrically between a scanning start side and a scanning end side.

In order to excellently compensates for an asymmetrical change in field curvature or variation of spot diameter in the main scanning direction with respect to the optical axis due to the asymmetrical sagitta, the first and second imaging lenses 6a and 6b have surfaces where curvature radiuses in the sub-scanning direction asymmetrically change with respect to the optical axis along the main scanning direction.

Aspherical coefficients D2u to D10u and D21 to D101 in the sub-scanning section are different in the second to fourth surfaces. This shows that the curvature in the sub-scanning section changes asymmetrically with respect to the optical axis from on-axis to off-axis within an effective diameter of the lens surface.

TABLE 1

| Scanning system data | | |
|---|---|---|
| fθ coefficient (mm/rad) | f | 210 |
| used wavelength (nm) | λ | 790 |
| scanning lens refractive index | N | 1.523972 |
| maximum deflecting angle (°) | θmax | 42.2 |
| deflecting point-scanning lens R1 surface (mm) | D1 | 29.5 |
| scanning lens R1 surface-scanning lens R2 surface (mm) | D2 | 8 |
| scanning lens R2 surface-scanning lens R3 surface (mm) | D3 | 76.0 |
| scanning lens R3 surface-scanning lens R4 surface (mm) | D4 | 5.0 |
| scanning lens R4 surface-surface to be scanned (mm) | D5 | 130.1 |
| deflecting point-surface to be scanned (mm) | D | 248.6 |

TABLE 2

| Scanning lens shape | | | | |
|---|---|---|---|---|
| | First surface | Second surface | Third surface | Fourth surface |
| R | −6.16E+01 | −4.14E+01 | 1.55E+03 | 3.85E+02 |
| K | −8.75E+00 | 2.40E+05 | −3.57E+03 | −1.08E+02 |
| B4u | −1.75E−06 | −1.94E−06 | −3.04E−08 | −2.16E−07 |
| B6u | 3.21E−09 | 1.46E−09 | | 1.74E−11 |
| B8u | −3.26E−12 | −6.68E−13 | | −1.23E−15 |
| B10u | 1.09E−15 | −1.81E−16 | | 3.51E−20 |
| B4l | −1.75E−06 | −1.94E−06 | −3.04E−08 | −2.16E−07 |
| B6l | 3.21E−09 | 1.46E−09 | | 1.74E−11 |
| B8l | −3.26E−12 | −6.68E−13 | | −1.23E−15 |
| B10l | 1.09E−15 | −1.81E−16 | | 3.51E−20 |
| r | 1.20E+02 | −3.80E+01 | 1.95E+02 | −4.75E+01 |
| D2u | | 5.69E−05 | −6.16E−05 | 9.43E−05 |
| D4u | | 1.72E−07 | −5.50E−09 | −6.20E−09 |
| D6u | | | 7.29E−13 | 1.98E−12 |
| D8u | | | −3.80E−17 | −2.96E−16 |
| D10u | | | 1.95E−21 | 3.62E−20 |
| D2l | | 3.53E−05 | −6.16E−05 | 9.99E−05 |
| D4l | | 1.55E−07 | −5.50E−09 | −1.64E−08 |
| D6l | | | 7.29E−13 | 5.38E−12 |
| D8l | | | −3.80E−17 | −7.27E−16 |
| D10l | | | 1.95E−21 | 5.33E−20 |

In this embodiment, the incident surface (first surface) and the exit surface (second surface) of the first imaging lens 6a have aspherical (noncircular-arc) shapes represented by a function up to tenth order in the main-scanning section (main scanning direction). In the sub-scanning section (sub-scanning direction), the incident surface (first surface) thereof has a spherical shape, and the exit surface (second surface) thereof has a spherical shape where the curvature changes in the main scanning direction.

The incident surface (third surface) and the exit surface (fourth surface) of the second imaging lens 6b have aspherical (noncircular-arc) shapes represented by a function up to tenth order in the main-scanning section. In the sub-scanning section (sub-scanning direction), the incident surface (third surface) thereof and the exit surface (fourth surface) thereof are both formed into spherical shapes where curvatures change in the main scanning direction. The optical power in the sub-scanning section is made reduced from on-axis to off-axis in the main scanning direction, to thereby adjust a field curvature in the sub-scanning direction successfully.

In this embodiment, the first and second imaging lenses 6a and 6b are made of plastic materials (resins) as described above. However, the materials are not limited to plastic materials, and glass materials may be used.

FIGS. 3A to 3D illustrate geometrical aberrations of this embodiment.

As can be understood from FIGS. 3A to 3D, each aberration is adjusted to a level of no practical problem. A change in magnification in the sub-scanning direction depending on the image height is suppressed to 2% or less. Thus, a change in a spot shape in the sub-scanning direction by the image height is suppressed, whereby high imaging performance can be obtained. A change in magnification in the sub-scanning direction depending on the image height is preferably limited to 10% or less, more preferably 5% or less.

Referring to FIGS. 1, 4A and 4B, and 5, means and effects for achieving the object of this embodiment are described.

Figure 4A:
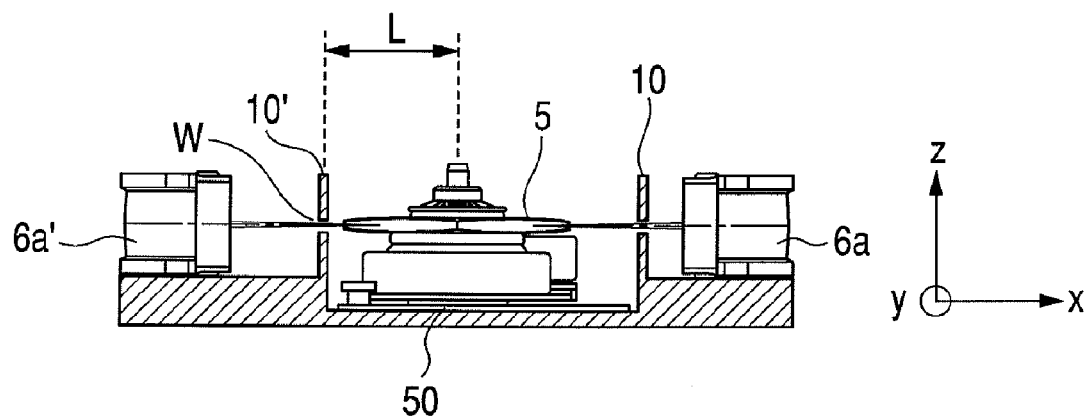
FIGS. 4A and 4B are main-scanning and sub-scanning main portion sectional diagrams of the optical scanning apparatus according to the first embodiment of the present invention.
Figure 4B:
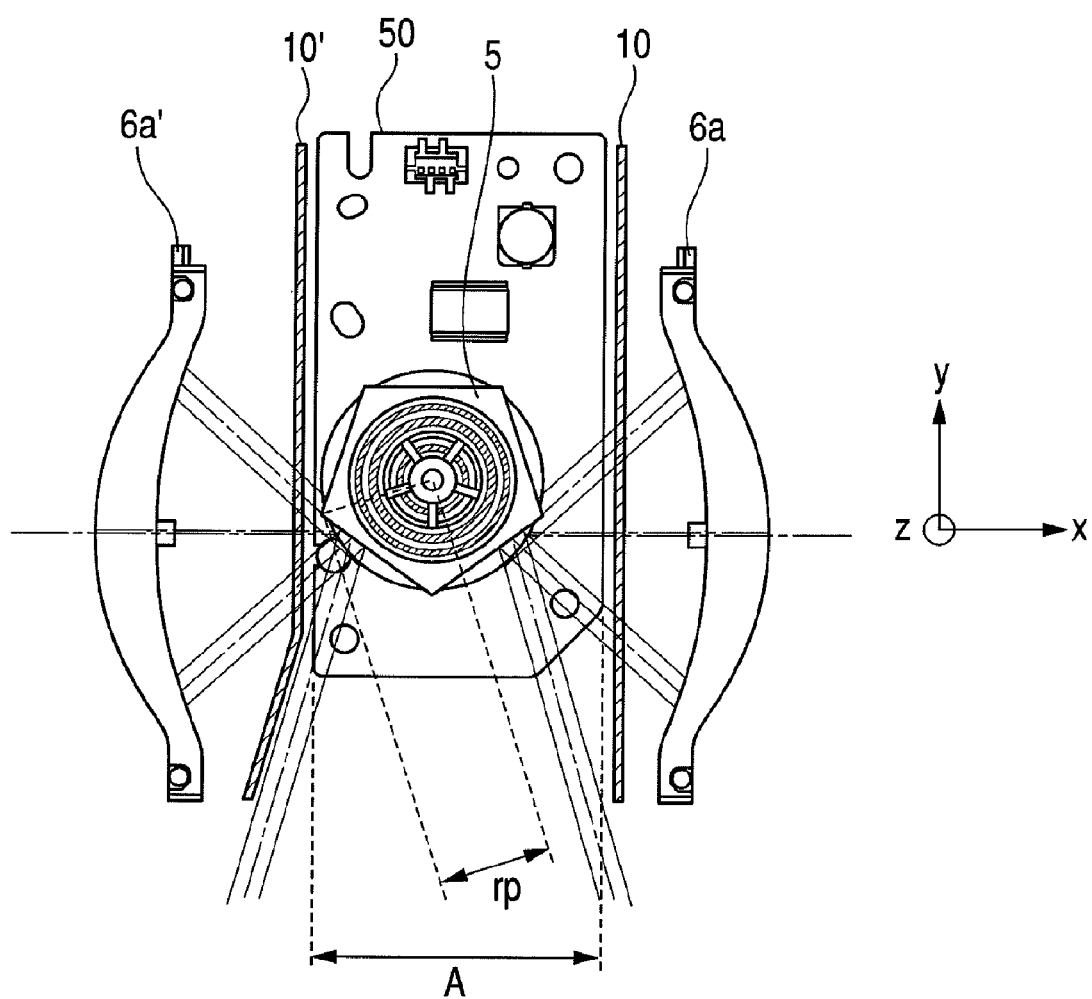

FIG. 4B illustrates a main-scanning section around the rotational polygon mirror according to this embodiment, and FIG. 4A is a sub-scanning section of FIG. 4B.

Figure 5:
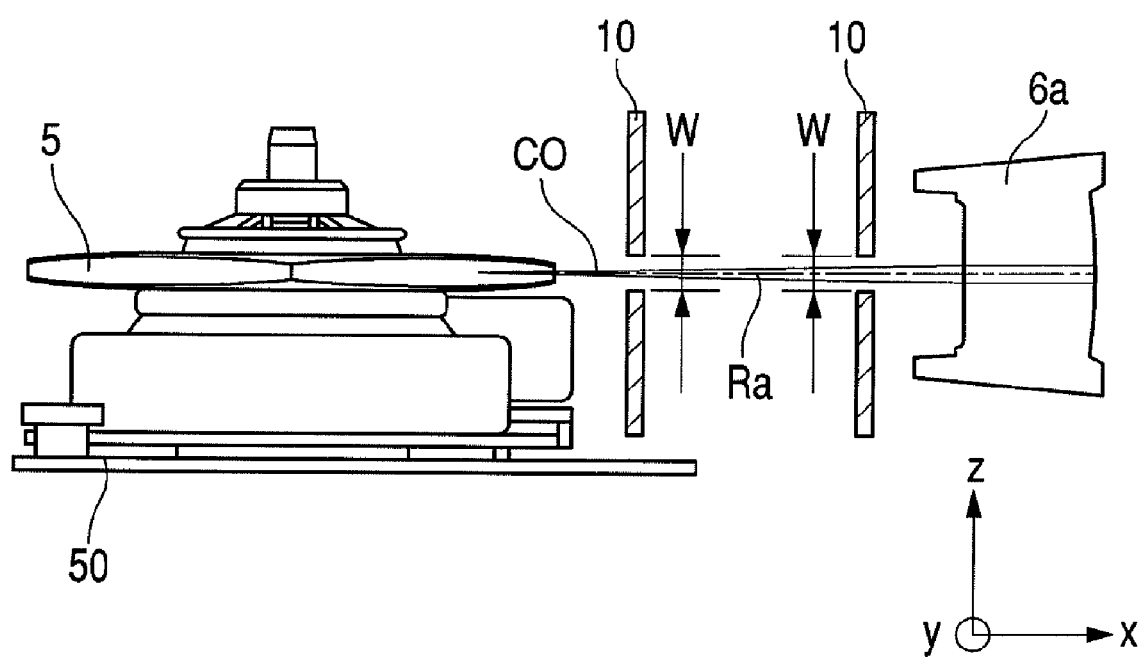
FIG. 5 illustrates a relationship between light beams and an undesirable-light blocking member according to the first embodiment of the present invention.

FIG. 5 illustrates a relationship between a scanning light beam and the undesirable-light blocking member according to this embodiment, that is, a relationship between a scanning light beam Ra and the undesirable-light blocking member when the undesirable-light blocking member 10 is disposed close to or away from the rotational polygon mirror 5. In FIGS. 4A and 4B, and 5, components similar to those of FIG. 1 are denoted by similar reference numerals.

In this embodiment, as illustrated in FIG. 1 described above, the first and second (third and fourth) stations S1 and S2 (S3 and S4) are symmetrically disposed two each in both sides of the rotational axis of the rotational polygon mirror 5, thereby constituting so-called opposed scanning units. Thus, an optical scanning apparatus mountable on a four-color (yellow (Y), magenta (M), cyan (C), and black (K)) image forming apparatus is configured.

In the opposed scanning units, as described above, a reflected light (undesirable light) on the imaging lens surface (optical surface) is transmitted through the other imaging lens symmetrically disposed with respect to the rotational polygon mirror 5 to reach the other surface to be scanned.

Thus, in this embodiment, between the rotational polygon mirror 5 and the first imaging lens 6a (6a'), the undesirable-light blocking member 10 (10') is disposed in a position away in the sub-scanning direction from the optical path of the scanning light beam (real light beam) Ra made incident on the surface to be scanned to block an undesirable light reflected on the imaging lens surface.

In order to block an undesirable light more surely, an opening width W of the undesirable-light blocking member 10 (10') in the sub-scanning section has to be narrowed as much as possible within a range in which a real light beam is not blocked.

In this embodiment, even when the deflecting surface of the rotational polygon mirror 5 tilts, the deflecting surface and the surface to be scanned are configured to have a conjugate relationship therebetween so as to prevent a position on the surface to be scanned at which the light beam reaches from being shifted in the sub-scanning direction, thereby compensating for an optical face tangle error of the deflection surface.

In other words, as illustrated in FIG. 5, a scanning light beam Ra immediately after deflection forms a substantial point image in the sub-scanning section, and then a width of the scanning light beam Ra monotonously increases until it passes through the imaging lens 6a having power in the sub-scanning section.

In short, in order to narrow the opening width W of the undesirable-light blocking member 10 in the sub-scanning section without blocking the scanning light beam Ra, as illustrated in FIG. 5, the undesirable-light blocking member 10 has to be brought close to the rotational polygon mirror 5 as much as possible.

Thus, in this embodiment, by satisfying the following conditional expression (1), the undesirable-light blocking member more effectively blocks an undesirable light without blocking the scanning light beam Ra.

Specifically, in this embodiment, a circumcircle radius of the rotational polygon mirror 5 is denoted by rp(mm), a distance from the rotational center of the rotational polygon mirror 5 to the undesirable-light blocking member 10' disposed in the second scanning unit U2 in the direction of the optical axis of the imaging optical system 6' is denoted by L(mm), and a length of the drive circuit substrate 50 in the direction of the optical axis of the imaging optical system 6' is denoted by A(mm).

The distance L may be a distance from the rotational center of the rotational polygon mirror 5 to one of the undesirable-light blocking members. In this embodiment, the distance L is a distance to the undesirable-light blocking member 10' disposed in the second scanning unit U2.

In this case, respective elements are set to satisfy the following condition:

$$rp < L \leq A/2 \quad (1)$$

If L is equal to or smaller than the lower limit value of the conditional expression (1), it is not desirable because the undesirable-light blocking member 10' interferes with the rotational polygon minor 5. If L is equal to or larger than the upper limit value of the conditional expression (1), it is not desirable because the opening width W of the undesirable-light blocking member 10' in the sub-scanning section greatly increases to disable blocking of an undesirable light.

It is assumed that a distance from the rotational center of the rotational polygon mirror 5 to the undesirable-light blocking member 10 of the first scanning unit U1 in the optical axis direction of the imaging optical system is denoted by L', and a length of the drive circuit substrate 50 for driving the rotational polygon mirror 5 in the direction of the optical axis of the imaging optical system is denoted by A. In this case, the following condition is satisfied:

$$A/2 < L'$$

An opening width of the undesirable-light blocking member 10' of the second scanning unit U2 in the sub-scanning direction is made narrower than that of the undesirable-light blocking member 10 of the first scanning unit U1 in the sub-scanning direction.

In this embodiment, the circumcircle radius rp of the rotational polygon mirror 5, the distance L from the rotational center of the rotational polygon mirror 5 to the undesirable-light blocking member 10', and the length A of the drive circuit substrate 50 of the rotational polygon mirror 5 are set as follows:

rp=17 mm
L=19 mm
A=42 mm

These satisfy the conditional expression (1).

The opening width of the undesirable-light blocking member of the optical scanning apparatus of this embodiment is compared with that of a conventional optical scanning apparatus.

Figure 6A:
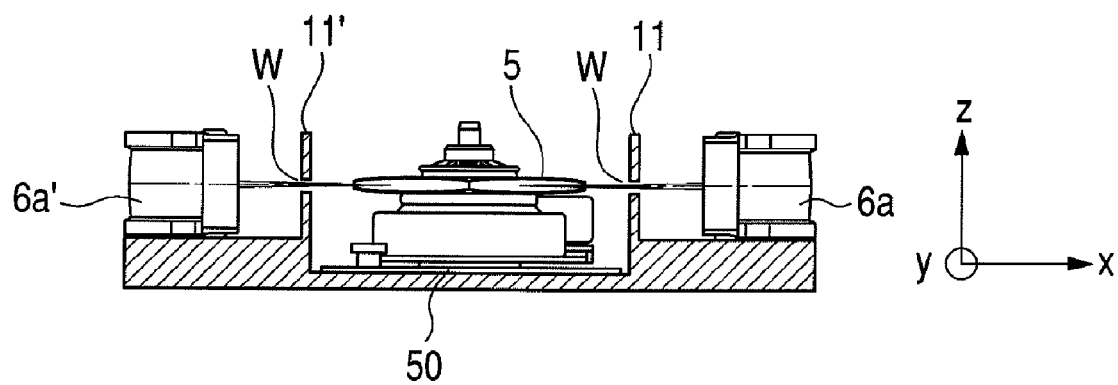
FIGS. 6A and 6B are sub-scanning sectional diagrams of a conventional optical scanning apparatus.
Figure 6B:
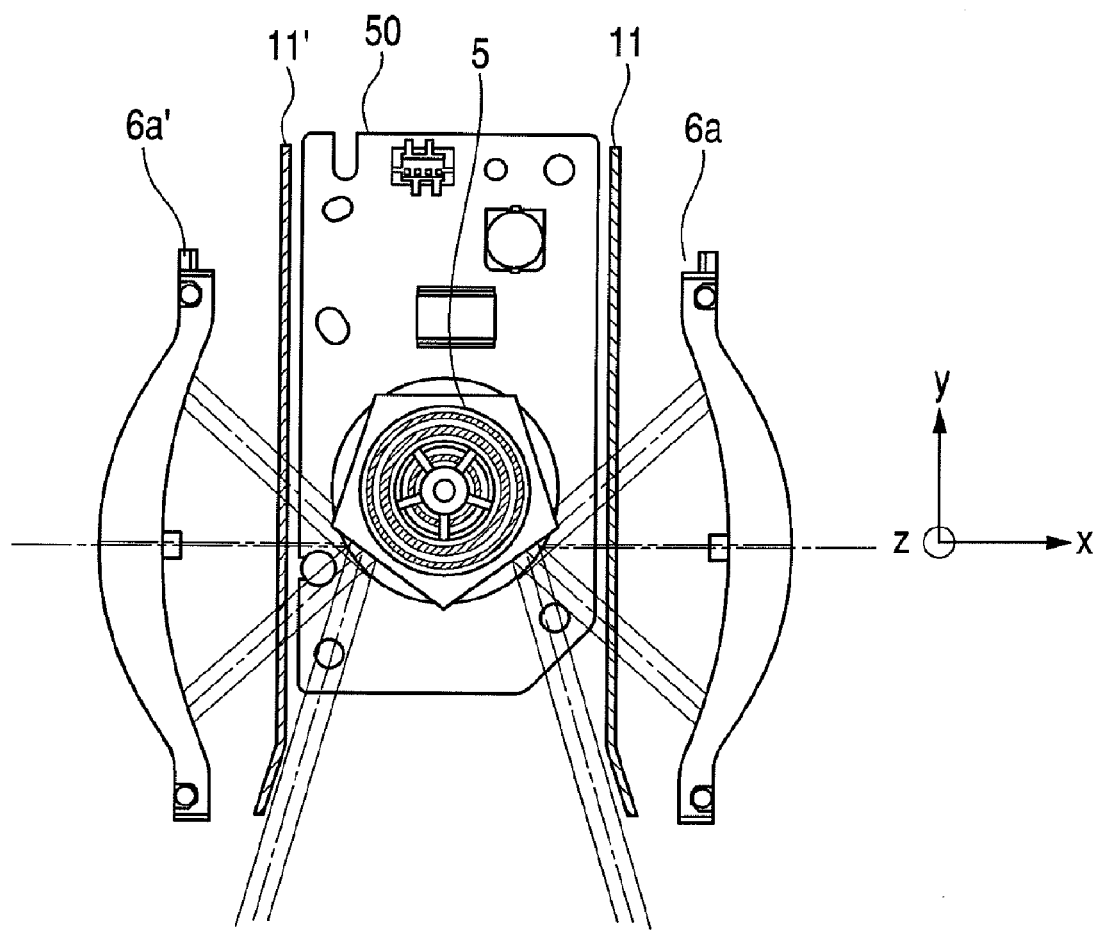

FIGS. 6A and 6B are main portion sectional diagrams of the conventional optical scanning apparatus. FIG. 6B illustrates a main-scanning section, and FIG. 6A illustrates a sub-scanning section of FIG. 6B.

In FIGS. 6A and 6B, the following is set:

rp=17 mm
L=23 mm
A=42 mm

As illustrated in the conventional example of FIGS. 6A and 6B in which L is equal to or larger than the upper limit value of the conditional expression (1), the opening widths W of the undesirable-light blocking members 11 and 11' in the sub-scanning section are 2.42 mm. On the other hand, in the embodiment of the present invention, by satisfying the conditional expression (1), as illustrated in FIG. 4A, the opening width W of the undesirable-light blocking member 10' in the sub-scanning section is 2.28 mm, and thus an undesirable light passing through the opening can be blocked without blocking a real light beam.

In this case, the opening width of the undesirable-light blocking member 10 in the sub-scanning section increases. However, when the opening width W of the undesirable-light blocking member 10' is narrow, an effect of blocking an undesirable light is enhanced.

However, the undesirable-light blocking member 10' and the optical box are made of plastic materials and formed integrally so as to facilitate manufacturing, and the drive circuit substrate 50 for rotating and driving the rotational polygon mirror 5 is formed large so as to reduce rotational axis tilting of the rotational polygon mirror. In the case of integral formation by injection molding, the undesirable-light blocking member 10' should not have a complex shape since a mold is pulled out in one direction. In other words, the undesirable-light blocking member 10' is preferably formed into a flat plate shape parallel to the rotational axis direction of the rotational polygon mirror 5.

Thus, in order to dispose the undesirable-light blocking member 10' close to the rotational axis of the rotational polygon mirror 5, as illustrated in FIGS. 4A and 4B, the drive circuit substrate 50 is made eccentric (displaced) in the optical axis direction of the imaging optical system with respect to the rotational axis of the rotational polygon mirror 5. Thus, the undesirable-light blocking member 10' can be disposed by satisfying the conditional expression (1).

In this embodiment, as described above, the drive circuit substrate 50 is made eccentric with respect to the rotational axis of the rotational polygon mirror 5. However, the present invention is not limited to this, and any configuration can be employed as long as the undesirable-light blocking member 10' can be disposed close to the rotational polygon mirror 5.

Disposing the undesirable-light blocking members 10 and 10' in both sides of the rotational polygon mirror 5 interposed therebetween enables sure blocking of an unexpectedly generated undesirable light.

Thus, as described above, this embodiment enables effective blocking of an undesirable light even in the opposed scanning units. As a result, this embodiment enables achievement of an optical scanning apparatus and a color image forming apparatus, which are capable of obtaining high-quality images by a simple configuration without any deterioration in imaging performance of a color LBP or a color copying machine.

In this embodiment, the light source 1a includes a single light emitting unit (light emitting point). However, the present invention is not limited to this, and the light source 1a may include multiple light emitting units. In this embodiment, the imaging optical system 6 (6') includes two imaging optical elements (imaging lenses). However, the present invention is not limited to this, and the imaging optical system 6 (6') may include one, or three or more imaging optical elements.

Second Embodiment

Figure 7A:
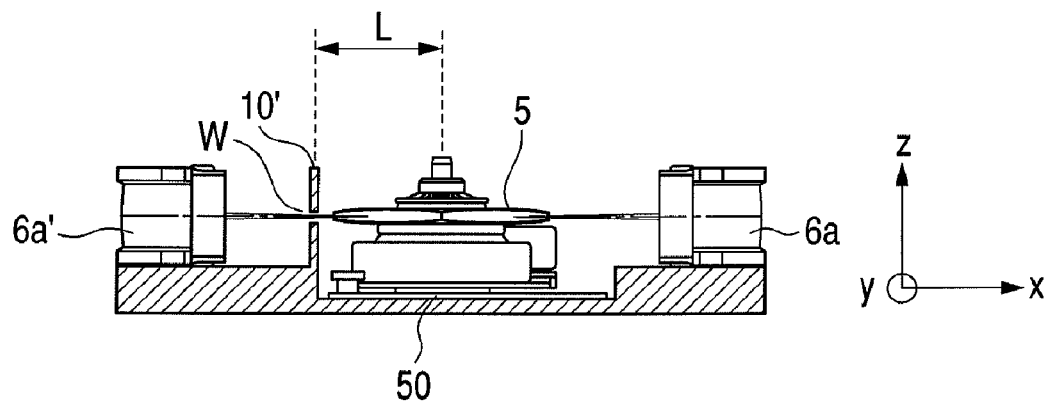
FIGS. 7A and 7B are main-scanning and sub-scanning sectional diagrams of an optical scanning apparatus according to a second embodiment of the present invention.
Figure 7B:
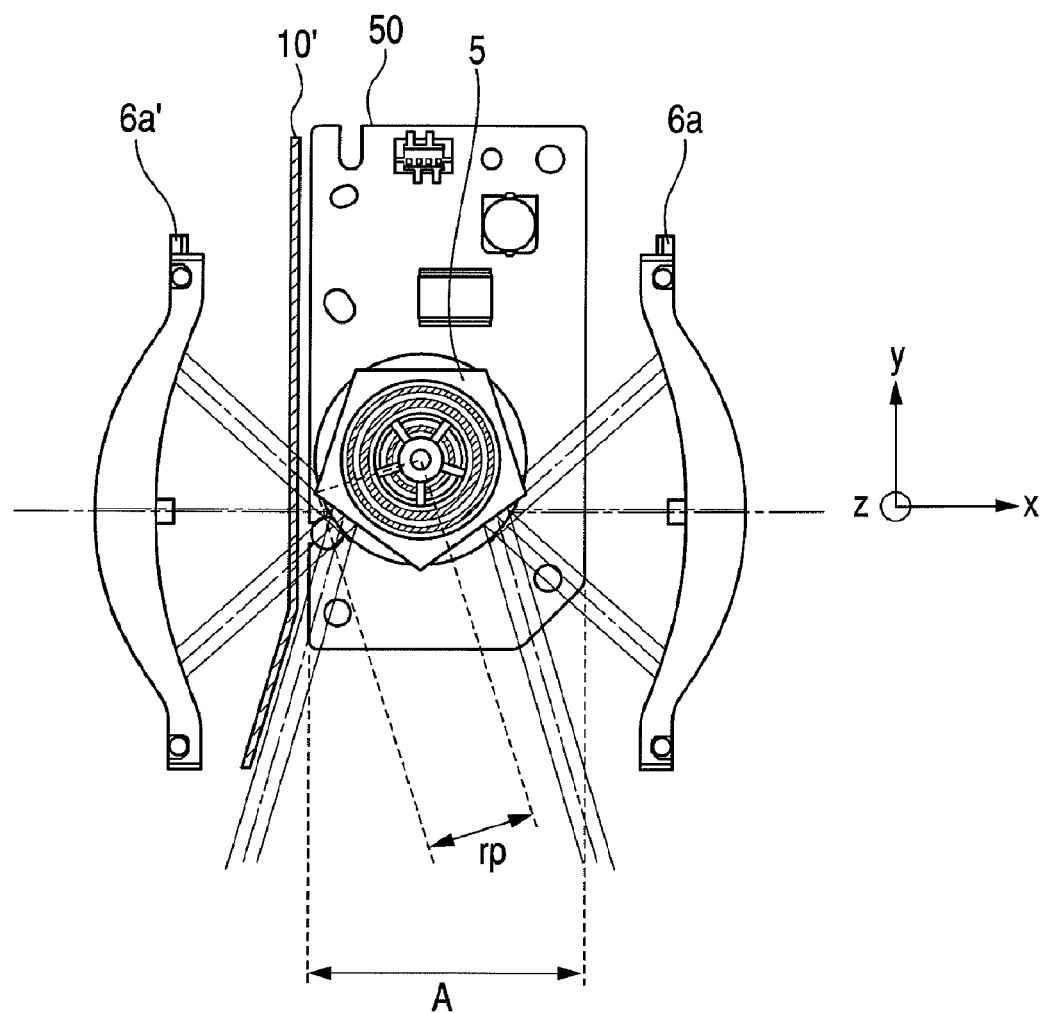

FIG. 7B illustrates a main-scanning section around a rotational polygon mirror according to a second embodiment of the present invention, and FIG. 7A illustrates a sub-scanning section of FIG. 7B. In FIGS. 7A and 7B, components similar to those illustrated in FIGS. 4A and 4B are denoted by similar reference numerals.

The second embodiment is different from the first embodiment in that an undesirable-light blocking member 10' is disposed only in one side (second (fourth) scanning unit U2 (U4) side) with respect to a rotational polygon mirror 5. Other configurations and optical operations are similar to those of the first embodiment, and similar effects are accordingly obtained.

Specifically, this embodiment employs a configuration where a drive circuit substrate 50 for rotating and driving the rotational polygon mirror 5 is made more eccentric with respect to a rotational axis of the rotational polygon mirror 5 to dispose the undesirable-light blocking member 10' close to the rotational axis of the rotational polygon minor 5, and an opening width W in the sub-scanning section is set narrow. Thus, even when the undesirable-light blocking member 10' is disposed only in one side (second (fourth) scanning unit U2 (U4) side) with respect to the rotational polygon minor 5, an undesirable light can surely be blocked.

Formation of the undesirable-light blocking member 10' is facilitated. When the undesirable-light blocking member 10' and an optical box are made as separate members without being integrally formed, the number of assembling steps is reduced.

In this embodiment, so as to satisfy the conditional expression (1), the circumcircle radius rp of the rotational polygon mirror 5, the distance L from the rotational center of the rotational polygon mirror 5 to the undesirable-light blocking member 10', and the length A of the drive circuit substrate 50 of the rotational polygon mirror 5 are set as follows:

rp=17 mm
L=19 mm
A=42 mm

These satisfy the conditional expression (1).

In this case, an opening width W of the undesirable-light blocking member 10' in the sub-scanning section is 2.28 mm, enabling blocking of undesirable lights without any problems.

In this embodiment, the undesirable-light blocking member is disposed in the scanning unit U2 (U4) side. However, the present invention is not limited to this, and the undesirable-light blocking member may be disposed in a scanning unit U1 (U3) side.

Third Embodiment

Figure 8:
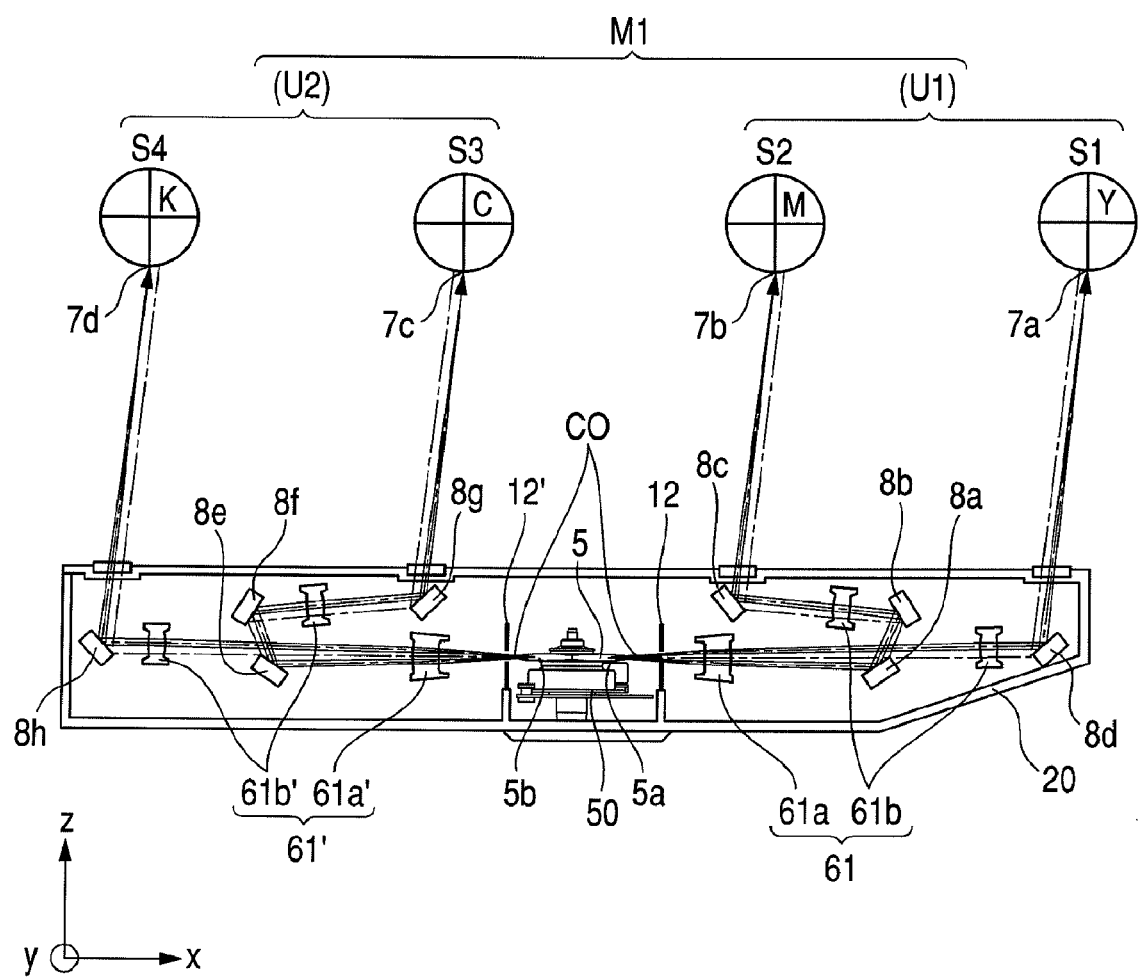
FIG. 8 is a sub-scanning sectional diagram of an optical scanning apparatus according to a third embodiment of the present invention.

FIG. 8 illustrates a main-portion section in a sub-scanning direction (sub-scanning section) according to a third embodiment of the present invention. Components of FIG. 8 similar to those of FIG. 1 are denoted by similar reference numerals.

The third embodiment is different from the first embodiment in that only a first optical scanning apparatus M1 is used, each of scanning units U1 and U2 includes multiple stations (two in this embodiment), and multiple light beams enter the same deflecting surface of an optical deflector 5 at different angles in a sub-scanning section. The third embodiment is further different from the first embodiment in that surface shapes of imaging lenses constituting imaging optical systems of the stations S1 to S4 are changed, and positions and shapes of undesirable-light blocking members 12 and 12' are changed. Other configurations and optical operations are similar to those of the first embodiment, and similar effects are accordingly obtained.

Specifically, FIG. 8 illustrates an optical scanning apparatus M1 which includes first and second scanning units U1 and U2. The first scanning unit U1 that is one scanning unit includes first and second stations S1 and S2 for yellow (Y) and magenta (M). The second scanning unit U2 that is the other scanning unit includes third and fourth stations S3 and S4 for cyan (C) and black (K).

The first and second scanning units U1 and U2 are similar in configuration and optical operation. Thus, the first scanning unit U1 is mainly described. Members of the second scanning unit U2 similar to those of the first scanning unit U1 are bracketed. Each member of the second scanning unit U2 is described when necessary.

The rotational polygon mirror (optical deflector) 5 serving as a deflection unit is rotated at a constant speed by a driving unit (not shown) such as a motor, and shared by the first and second scanning units U1 and U2.

An imaging optical system 61 (61') includes a first imaging lens 61a (61a') serving as a first imaging optical element made of plastic material and a second imaging lens 61b (61b') serving as a second imaging optical element made of plastic material. The imaging optical system 61 (61') may include three or more imaging optical elements.

The imaging optical system 61 (61') forms a spot-image, on photosensitive drum surfaces 7a and 7b (7c and 7d) which are surfaces to be scanned (described later) in a main scanning section, of the light beams based on image information and deflected for scanning by the rotational polygon mirror 5. The deflecting surface 5a (5b) of the rotational polygon mirror 5 and the photosensitive drum surfaces 7a and 7b (7c and 7d) are configured to have an optical conjugate relationship therebetween in the sub-scanning section, to thereby provide an optical face tangle error correction function.

In this embodiment, the first imaging lens 61a (61a') is shared by the two stations S1 and S2 (S3 and S4) constituting the first (second) scanning unit U1 (U2)

Photosensitive drums 7a to 7d serving as recording media are photosensitive drums (surfaces to be scanned) for yellow (Y), magenta (M), cyan (C), and black (K) colors, respectively.

Reflection members (reflection mirrors) 8a, 8b, 8c, and 8d (8e, 8f, 8g, and 8h) each include a plane mirror, and turn back light beams having passed through the first and second imaging lenses 61a and 61b (61a' and 61b') to the corresponding photosensitive drum surfaces 7a and 7b (7c and 7d). The reflection mirrors 8a, 8b, and 8c (8e, 8f, and 8g) may each have power in the main-scanning section or the sub-scanning section.

An undesirable-light blocking member 12 (12') is disposed within the first (second) scanning unit U1 (U2) and away in the sub-scanning direction from an optical path of the scanned light beam deflected for scanning on the deflecting surface 5a (5b) of the rotational polygon mirror 5 to enter the surfaces 7a and 7b (7c and 7d) to be scanned.

In this embodiment, the undesirable-light blocking members 12 and 12' are disposed in both sides of the rotational polygon mirror 5 interposed therebetween, and formed integrally with an optical box 20 for housing the rotational polygon mirror 5 and the first and second imaging lenses 61a and 61b (61a' and 61b').

The undesirable-light blocking member 12 (12') blocks an undesirable light (flare light or ghost light) reflected on the surface of the imaging optical element 61' (61) while transmitting a light beam deflected for scanning by the rotational polygon mirror 5.

In this embodiment, as illustrated in FIG. 8, the first and second scanning units U1 and U2 are symmetrically disposed two by each in both sides of the rotational polygon mirror 5 with respect to the rotational axis to constitute opposed scanning units. Thus, an optical scanning apparatus mountable on a four-color (yellow (Y), magenta (M), cyan (C), and black (K)) image forming apparatus can be configured.

In this embodiment, in the main-scanning section, the light beam enters the deflecting surface of the rotational polygon mirror 5 obliquely with respect to a normal of the deflecting surface of the rotational polygon mirror 5.

In this embodiment, in the sub-scanning section, the light beam enters the deflecting surface of the rotational polygon mirror 5 obliquely with respect to the normal of the deflecting surface of the rotational polygon mirror 5.

In the first scanning unit U1, in the sub-scanning section, two light beams emitted from two light sources (not shown) are made obliquely incident on the deflection surface 5a from upper and lower directions with respect to the optical reference axis C0 obliquely with respect to the normal of the same deflecting surface 5a of the rotational polygon mirror 5.

In the second scanning unit U2, in the sub-scanning section, two light beams emitted from two light sources (not shown) are made obliquely incident on the deflection surface 5a from upper and lower directions with respect to the optical reference axis C0 obliquely with respect to the normal of the same deflecting surface 5b of the rotational polygon mirror 5.

The light beam that has entered the deflecting surface 5a (5b) obliquely from the upper side is reflected obliquely downward, and the light beam that has entered the deflecting surface 5a (5b) obliquely from the lower side is reflected obliquely upward. An optical path is separated by the imaging optical system 61 (61') via the corresponding reflection mirrors 8a to 8d (8e to 8h).

The separated four light beams are guided onto corresponding photosensitive drum surfaces 7a to 7d for yellow (Y), magenta (M), cyan (C), and black (K) to form a color image.

Thus, in FIG. 8, as described above, the first and second scanning units U1 and U2 are disposed so as to share the rotational polygon mirror 5 thereof. Multiple light beams from the scanning units U1 and U2 are guided to the different deflecting surfaces 5a and 5b of the rotational polygon mirror 5 respectively for the scanning units U1 and U2. The multiple light beams in the scanning units U1 and U2 enter the different surfaces 7a to 7d to be scanned to form a color image.

In this embodiment, both the two light beams deflected for scanning on the same deflecting surface 5a (5b) pass through the first imaging lens 61a (61a'). Thus, the number of imaging lenses is reduced to configure an imaging optical system 6 (6'), thereby enabling miniaturization.

Figure 9:
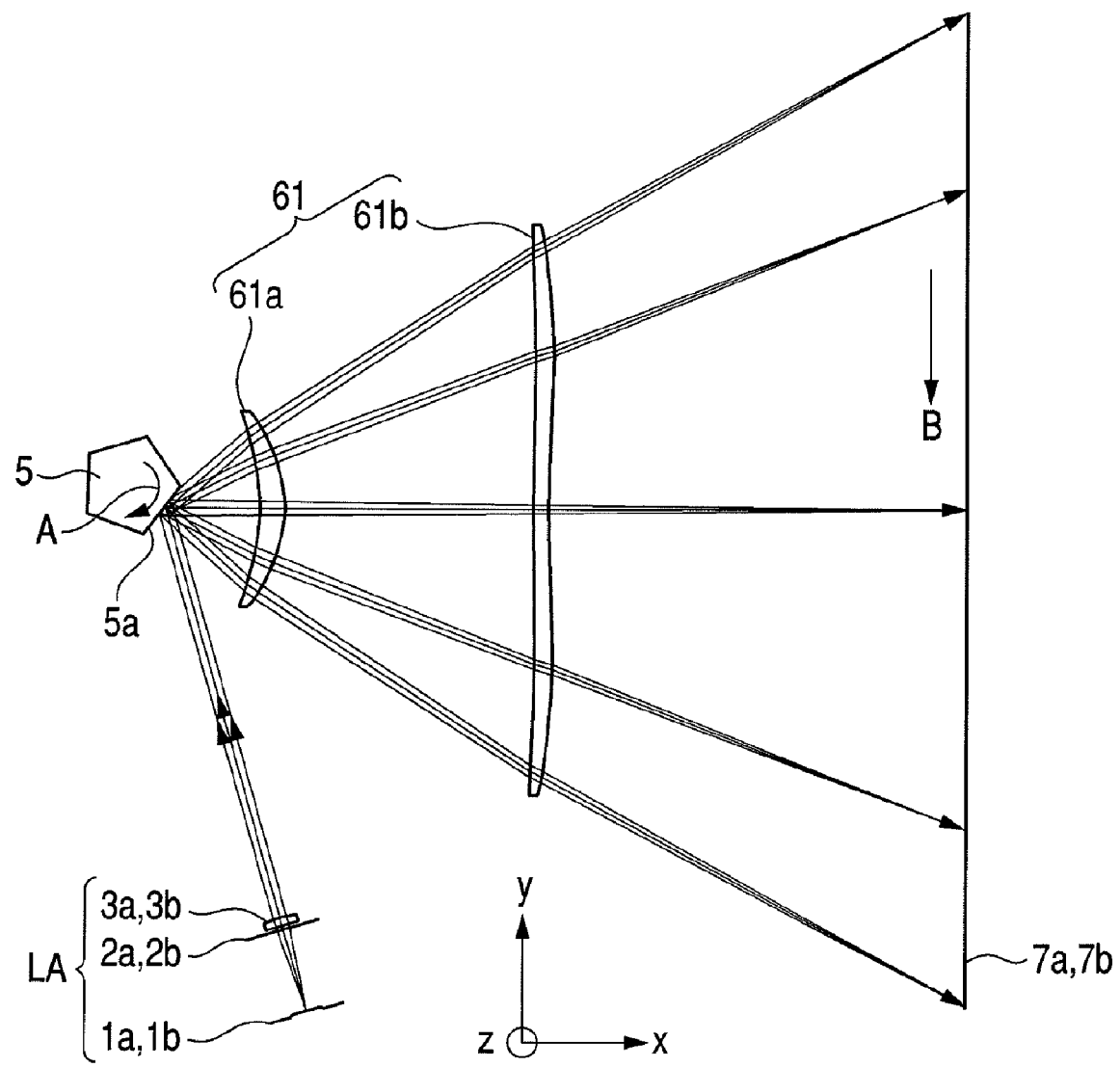
FIG. 9 is a main-scanning sectional diagram of the optical scanning apparatus according to the third embodiment of the present invention.
Figure 10A:
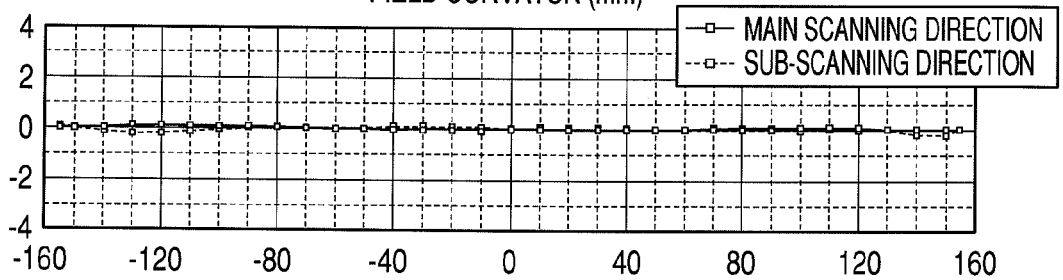
FIGS. 10A, 10B, 10C and 10D illustrate geometrical aberrations and uniformity in magnification in a sub-scanning direction according to the third embodiment of the present invention.
Figure 10B:
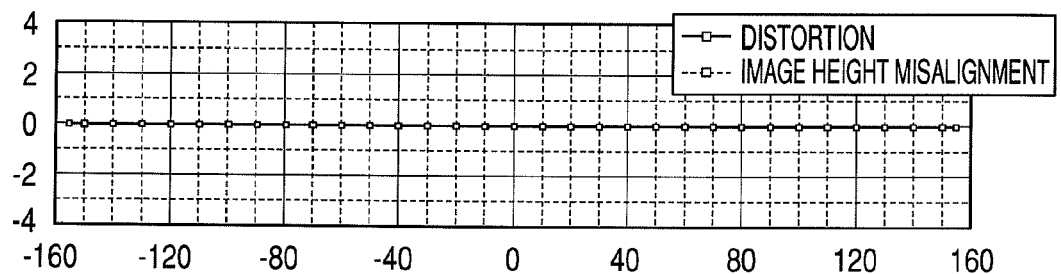
Figure 10C:
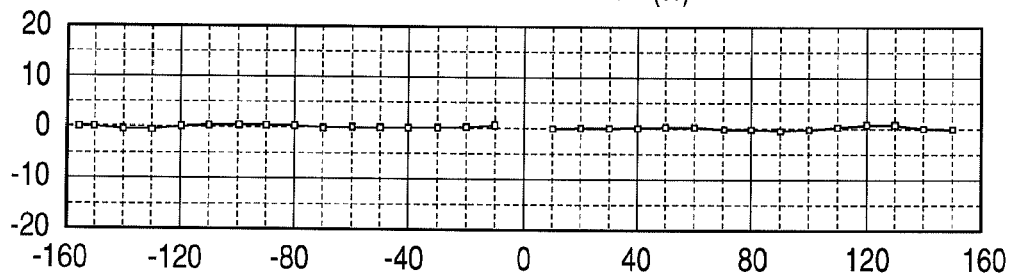
Figure 10D:
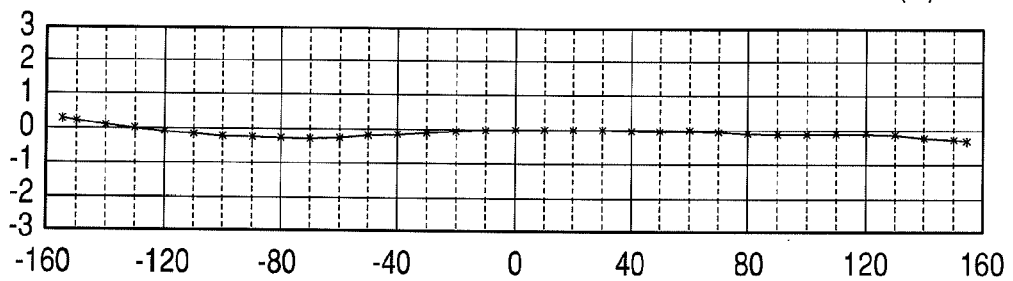

FIG. 9 is a main portion sectional diagram in the main scanning direction (main-scanning sectional diagram), of the first scanning unit U1 shown in FIG. 8, illustrating a spread-out optical path. In FIG. 9, the undesirable-light blocking member and the reflection mirror shown in FIG. 8 are omitted.

FIG. 9 illustrates only the first scanning unit U1. The second scanning unit U2 is similar in configuration and optical operation to the first scanning unit U1.

In FIG. 9, light sources 1a and 1b each include a semiconductor laser.

Aperture stops 2a and 2b each form a diverged light beam emitted from multiple light sources 1a and 1b into a specific beam shape. Condenser lenses (anamorphotic lenses) 3a and 3b each have different refractive powers between in the main scanning direction (in main-scanning section) and in the sub-scanning direction (in sub-scanning section). Thus, the diverged light beam which has passed through the aperture stops 2a and 2b is converted into a parallel light beam (or converged light beam) in the main scanning direction, and into a converged light beam in the sub-scanning direction.

The aperture stops 2a and 2b and the condenser lenses 3a and 3b constitute parts of an incident optical system LA.

The incident optical system LA guides the multiple light beams emitted from the multiple light sources 1a and 1b to the same deflecting surface 5a of the deflection unit 5 at angles different from each other in the sub-scanning section.

Two optical elements (collimator lens and cylinder lens) may constitute the condenser lens 3a or 3b. Further, the condenser lenses 3a and 3b may be integrated with each other.

The optical deflector 5 that is the deflection unit includes a five-surface rotational polygon mirror having a circumcircle of a diameter of 34 mm, and is rotated at a constant speed (constant angular velocity) in an direction indicated by the arrow A by a motor as a driving unit (not shown). The imaging optical system 61 has a condensing function and fθ characteristics. In this embodiment, the imaging optical system 61 includes first and second imaging lenses (scanning lenses) 61a and 61b which are imaging optical elements having different powers between the main scanning direction (in main-scanning section) and the sub-scanning direction (in sub-scanning section).

The first and second imaging lenses 61a and 61b of this embodiment are made of plastic materials, and cause multiple light beams based on image information and deflected for scanning by the same deflecting surface 5a of the rotational polygon mirror 5 to form an image on the surfaces of the photosensitive drums 7a and 7b as different surfaces to be scanned. The deflecting surface 5a of the rotational polygon mirror 5 and the surfaces of the photosensitive drums 7a and 7b are configured to have a conjugate relationship therebetween in the sub-scanning section, so that the first and second imaging lenses 61a and 61b compensate for the optical face tangle error of the deflecting surface 5a.

The first imaging lens 61a has positive powers in the main-scanning and sub-scanning sections on its optical axis.

The second imaging lens 61b has a negative power in the main-scanning section and a positive power in the sub-scanning section on its optical axis.

The photosensitive drum surfaces (photosensitive drums) 7a and 7b are surfaces to be scanned.

In this embodiment, two diverged light beams optically modulated and emitted from two light sources 1a and 1b according to image information are regulated by the corresponding aperture stops 2a and 2b to enter the condenser lenses 3a and 3b. The light beams made incident on the condenser lenses 3a and 3b exit therefrom as a parallel light beam in the main-scanning section.

In the sub-scanning section, the light beams made incident on the condenser lenses 3a and 3b are converged to form a line image (line image longitudinal in the main scanning direction) at different angles on the same deflecting surface 5a of the rotational polygon mirror 5. The two light beams deflected for scanning on the deflecting surface 5a of the rotational polygon mirror 5 form spot-images on the different photosensitive drum surfaces 7a and 7b via the first and second imaging lenses 61a and 61b.

The light beam from the light source 1a that has been obliquely incident on the deflecting surface 5a of the rotational polygon mirror 5 from the upper side is reflected obliquely downward in the sub-scanning section, and the light beam from the light source 1b that has been obliquely incident on the deflecting surface 5a of the rotational polygon mirror 5 from the lower side is reflected obliquely upward.

Then, by rotating the rotational polygon mirror 5 in the direction indicated by an arrow A, the photosensitive drum surfaces 7a and 7b are optically scanned in the direction indicated by an arrow B (main scanning direction). Thus, an image is recorded on the photosensitive drum surfaces 7a and 7b serving as recording media.

In this embodiment, presuming that a printing width equal to an A3 size (ISO 216) is scanned, an effective scanning width of the surfaces 7a and 7b to be scanned is set to 310 mm to configure an optical system. However, the present invention is not limited to this, and can deal with larger or smaller sizes.

Tables 3 and 4 illustrate an optical arrangement of the optical elements of the scanning system and numerical values of surface shapes of the imaging optical elements (scanning lenses) according to the third embodiment.

TABLE 3

| Scanning system data | | |
|---|---|---|
| Sub-scanning direction oblique incident angle (°) | Y | 3 |
| fθ coefficient (mm/rad) | F | 210 |
| used wavelength (nm) | Λ | 790 |
| scanning lens refractive index | N | 1.523972 |
| maximum deflecting angle (°) | θmax | 42.2 |
| deflecting point-scanning lens R1 surface (mm) | D1 | 29.5 |
| scanning lens R1 surface-scanning lens R2 surface (mm) | D2 | 8 |
| scanning lens R2 surface-scanning lens R3 surface (mm) | D3 | 76.0 |
| scanning lens R3 surface-scanning lens R4 surface (mm) | D4 | 5.0 |
| scanning lens R4 surface-surface to be scanned (mm) | D5 | 130.1 |
| deflecting point-surface to be scanned (mm) | D | 248.6 |

TABLE 4

| Scanning lens shape | | | | |
|---|---|---|---|---|
| | First surface | Second surface | Third surface | Fourth surface |
| R | −6.16E+01 | −3.94E+01 | 1.55E+03 | 3.85E+02 |
| K | −8.75E+00 | −2.32E+00 | −3.57E+03 | −1.08E+02 |
| B4u | −1.75E−06 | −2.08E−06 | −3.04E−08 | −2.16E−07 |
| B6u | 3.21E−09 | 1.51E−09 | | 1.74E−11 |
| B8u | −3.26E−12 | −6.25E−13 | | −1.23E−15 |
| B10u | 1.09E−15 | −2.27E−16 | | 3.51E−20 |
| B4l | −1.75E−06 | −2.08E−06 | −3.04E−08 | −2.16E−07 |
| B6l | 3.21E−09 | 1.51E−09 | | 1.74E−11 |
| B8l | −3.26E−12 | −6.25E−13 | | −1.23E−15 |
| B10l | 1.09E−15 | −2.27E−16 | | 3.51E−20 |
| r | 1.20E+02 | −3.80E+01 | 1.95E+02 | −4.78E+01 |
| D2u | | 5.69E−05 | −6.16E−05 | 1.02E−04 |
| D4u | | 1.72E−07 | −5.50E−09 | −1.33E−08 |
| D6u | | | 7.29E−13 | 3.92E−12 |

TABLE 4-continued

Scanning lens shape

| | First surface | Second surface | Third surface | Fourth surface |
|---|---|---|---|---|
| D8u  | | | −3.80E−17 | −4.75E−16 |
| D10u | | | 1.95E−21  | 4.03E−20  |
| D2l  | | 3.53E−05 | −6.16E−05 | 1.02E−04  |
| D4l  | | 1.55E−07 | −5.50E−09 | −1.51E−08 |
| D6l  | | | 7.29E−13  | 4.30E−12  |
| D8l  | | | −3.80E−17 | −5.11E−16 |
| D10l | | | 1.95E−21  | 4.00E−20  |

In this embodiment, the incident surface (first surface) (R1) and the exit surface (second surface) (R2) of the first imaging lens 61a have aspherical (noncircular-arc) shapes represented by a function up to tenth order in the main-scanning section (main scanning direction). In the sub-scanning section (sub-scanning direction), the incident surface (first surface) has a spherical shape, and the exit surface (second surface) has a spherical shape in which a curvature changes in the main scanning direction.

The incident surface (third surface) (R3) and the exit surface (fourth surface) (R4) of the second imaging lens 61b have aspherical (noncircular-arc) shapes represented by a function up to tenth order in the main-scanning section. In the sub-scanning section (sub-scanning direction), the incident surface (third surface) and the exit surface (fourth surface) are both formed into spherical shapes in which curvatures change in the main scanning direction. Reducing power in the sub-scanning section from on-axis to off-axis in the main scanning direction enables good adjustment of a field curvature in the sub-scanning direction.

In this embodiment, the first and second imaging lenses 61a and 61b are made of plastic materials (resins) as described above. However, not limited to plastic materials, glass materials may be used.

FIGS. 10A to 10D illustrate geometrical aberrations in this embodiment.

As can be understood from FIGS. 10A to 10D, each aberration is adjusted to a level of no practical problem. A change in magnification in the sub-scanning direction depending on the image height is limited to 2% or less. Thus, a change in a spot shape in the sub-scanning direction depending on the image height is suppressed, whereby high imaging performance can be obtained. A change in magnification in the sub-scanning direction by the image height is desirably limited to 10% or less, and more desirably 5% or less.

Figure 11:
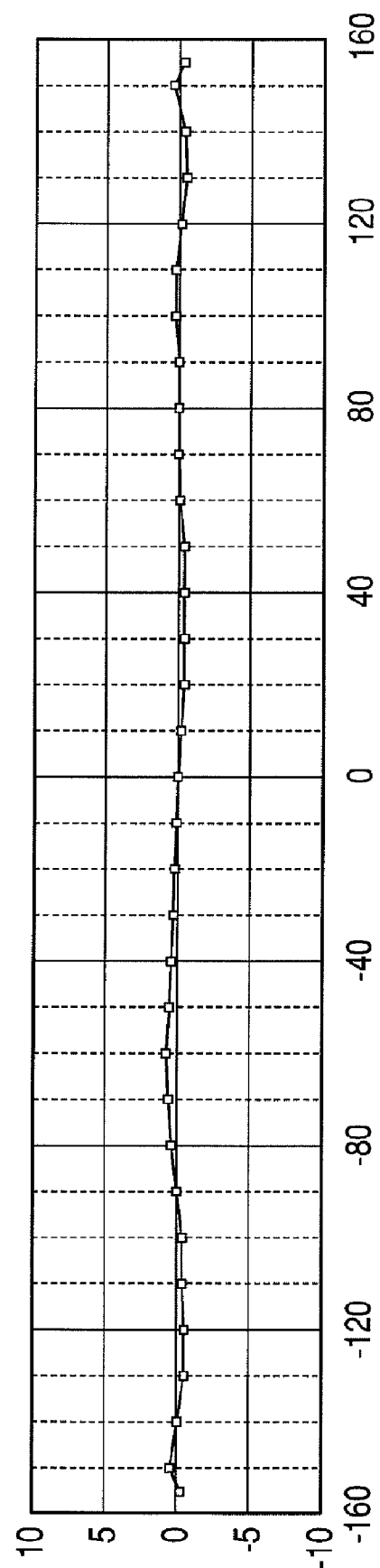
FIG. 11 illustrates scanning line curvatures of the optical scanning apparatus according to the third embodiment of the present invention.
Figure 12:
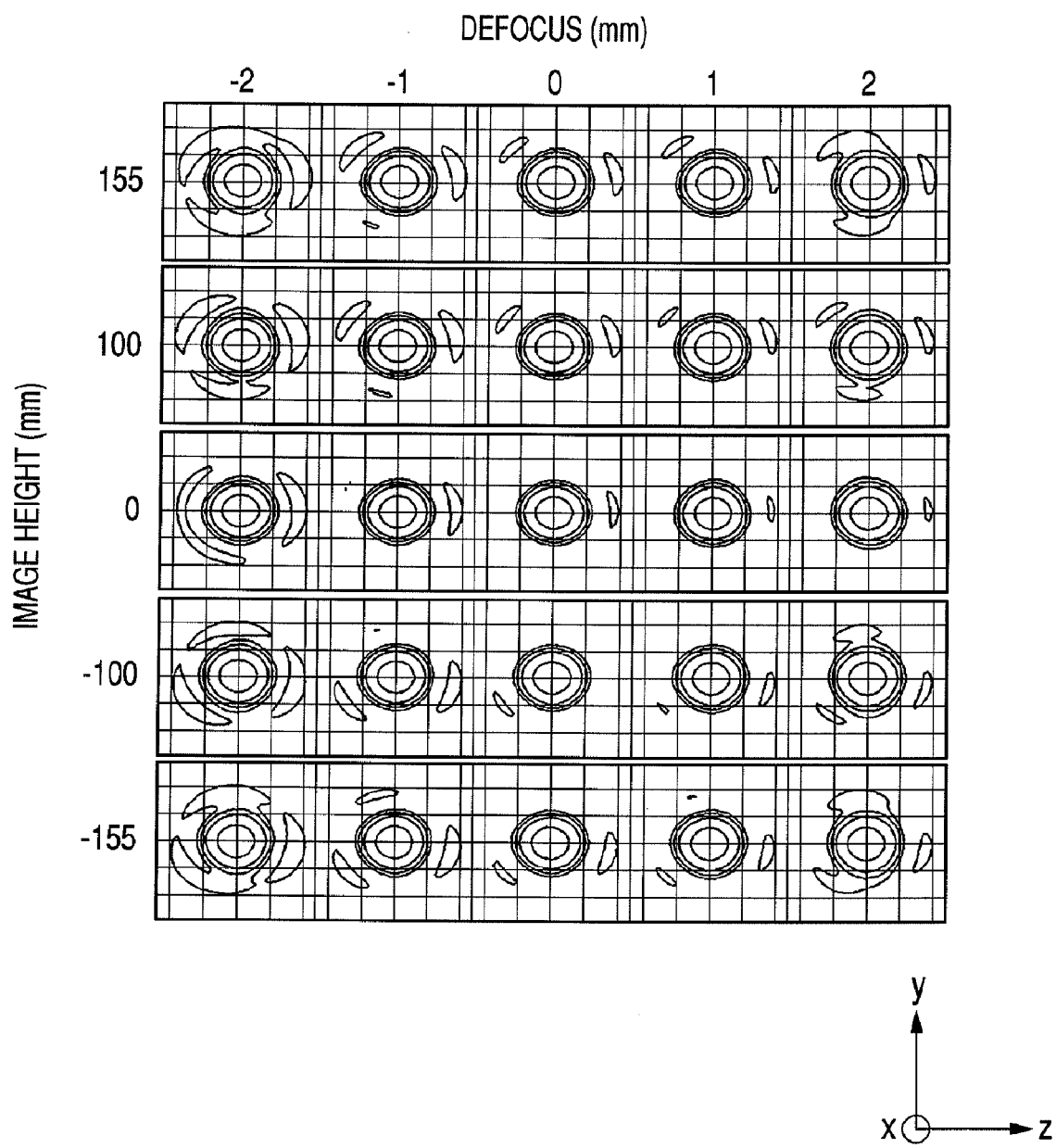
FIG. 12 illustrates a spot shape of the optical scanning apparatus according to the third embodiment of the present invention.

FIG. 11 illustrates scanning line curvatures on the surfaces 7a and 7b to be scanned. FIG. 12 illustrates an imaging spot of each image height on the surface 7 to be scanned.

The eccentricity of the second imaging lens 61b in the sub-scanning direction enables passage of a light beam through a position near an optical axis of the second imaging lens 61b in the sub-scanning section, thereby suppressing curving of a scanning line and rotation of an imaging spot. Thus, color misregistration is prevented from being conspicuous in a color image forming apparatus which includes the optical scanning apparatus of this embodiment.

Referring to FIGS. 8, 13A, 13B, and 14, means and effects for achieving the object of this embodiment are described.

Figure 13A:
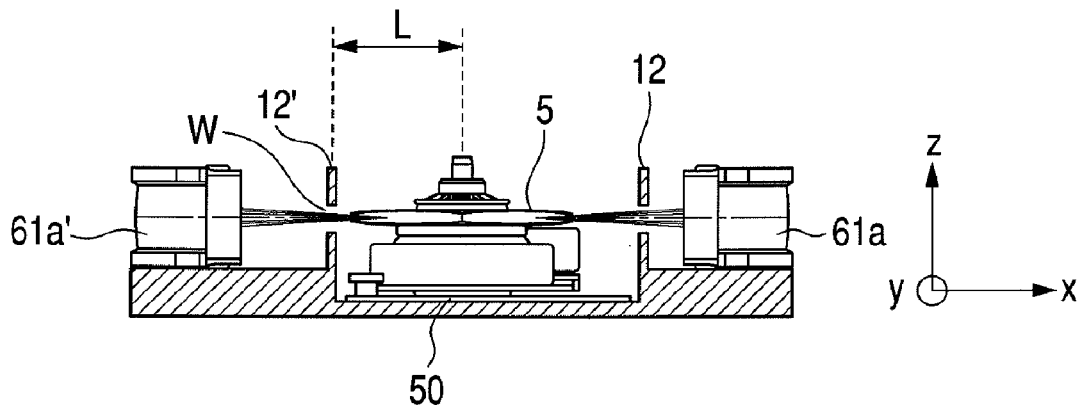
FIGS. 13A and 13B are main-scanning and sub-scanning sectional diagrams of the optical scanning apparatus according to the third embodiment of the present invention.
Figure 13B:
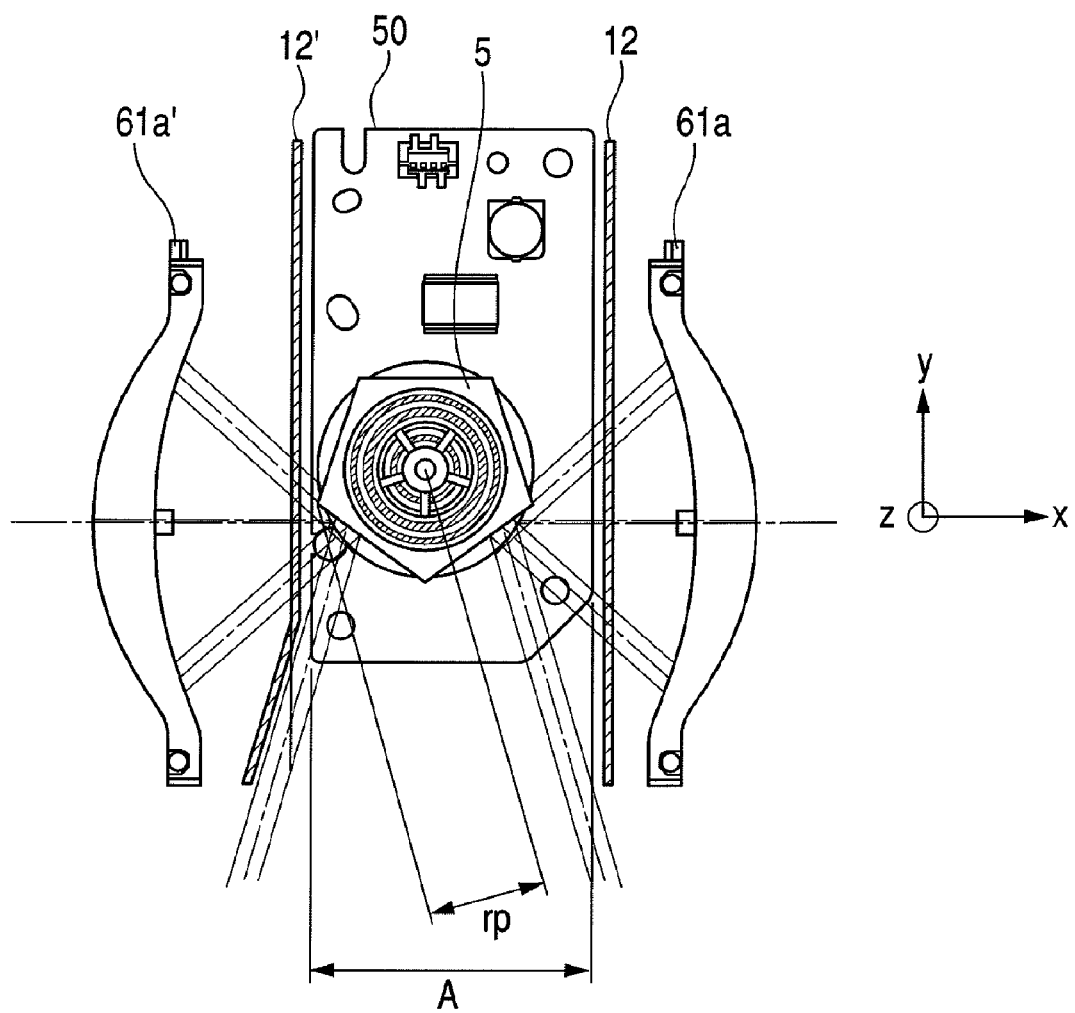

FIG. 13B illustrates a main-scanning section around the rotational polygon mirror according to this embodiment, and FIG. 13A is a sub-scanning section of FIG. 13B.

Figure 14:
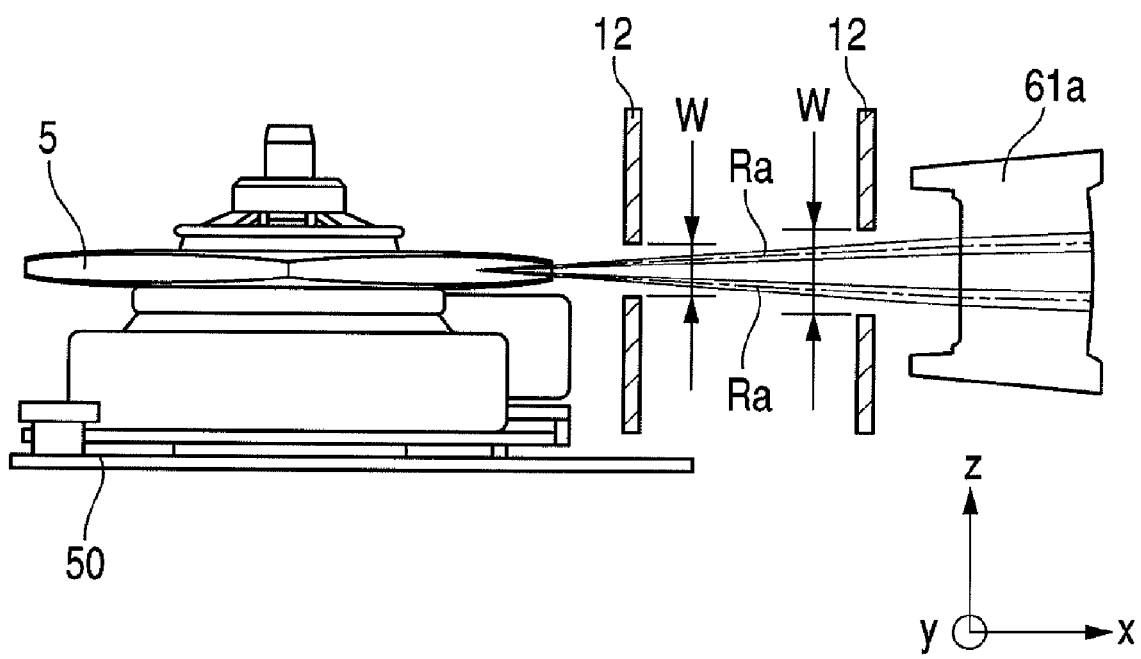
FIG. 14 illustrates a relationship between light beams and an undesirable-light blocking member according to the third embodiment of the present invention.

FIG. 14 illustrates a relationship between a scanning light beam and the undesirable-light blocking member according to this embodiment. FIG. 14 illustrates a relationship between the scanning light beam Ra and the undesirable-light blocking member when the undesirable-light blocking member 12 is disposed close to or away from the rotational polygon mirror 5. In FIGS. 13A, 13B, and 14, components similar to those of FIG. 1 are denoted by similar reference numerals and symbols.

In this embodiment, as described above, in order to guide multiple light beams deflected and reflected on the same deflecting surface 5a (5b) of the rotational polygon mirror 5 to the multiple surface 7a and 7b (7c and 7d) to be scanned, light beam separation has to be carried out in the optical path. Thus, a light beam is made incident obliquely on the same deflecting surfaces 5a (5b) of the rotational polygon mirror 5 in the sub-scanning section (oblique incident optical system).

In the opposed scanning units using the oblique incident optical system, as described above, a reflected light (undesirable light) reflected on the imaging lens surface is transmitted through the other imaging lens symmetrically disposed with respect to the rotational polygon mirror 5 to reach the other surface to be scanned.

Thus, in this embodiment, between the rotational polygon mirror 5 and the imaging lens 61a (61a'), the undesirable-light blocking member 12 (12') is disposed in a position away in the sub-scanning direction from the optical path of the scanning light beam Ra to be made incident on the surface to be scanned to block an undesirable light reflected on the imaging lens surface.

However, in order to block an undesirable light more surely, an opening width W of the undesirable-light blocking member 12 (12') in the sub-scanning section has to be narrowed as much as possible to such an extent so as not to block a real light beam.

In this embodiment, multiple light beams emitted from multiple light sources are incident on the same deflecting surface 5a (5b) of the rotational polygon mirror 5 at different angles with respect to a normal of the same deflecting surface 5a (5b) in the sub-scanning section. Thus, as illustrated in FIG. 14, after deflection, a separation amount of each scanning light beam Ra continuously increases until the scanning light beam Ra passes through the imaging lens 61a having power in the sub-scanning section.

In short, in order to narrow the opening width W of the undesirable-light blocking member 12 in the sub-scanning section without blocking the real light beam, as illustrated in FIG. 14, the undesirable-light blocking member 12 should be brought close to the rotational polygon mirror 5 as much as possible.

In this embodiment, in order to satisfy the above-mentioned conditional expression (1), a circumcircle radius rp of the rotational polygon mirror 5, the distance L from a rotational center of the rotational polygon mirror 5 to the undesirable-light blocking member 12', and the length A of the drive circuit substrate 50 of the rotational polygon mirror 5 are set as follows:

rp=17 mm
L=19 mm
A=42 mm

Those satisfy the conditional expression (1).

The distance L can be a distance from the rotational center of the rotational polygon mirror 5 to any one of the undesirable-light blocking members. In this embodiment, the distance L is a distance to the undesirable-light blocking member 12' disposed in the second scanning unit U2.

The opening width of the undesirable-light blocking member of the optical scanning apparatus of this embodiment is compared with that of a conventional optical scanning apparatus.

Figure 15A:
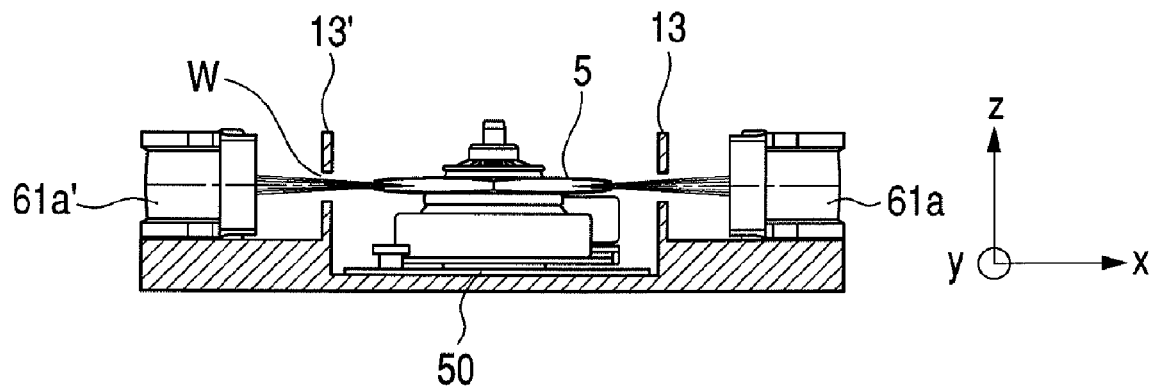
FIGS. 15A and 15B are sub-scanning sectional diagrams of a conventional optical scanning apparatus.
Figure 15B:
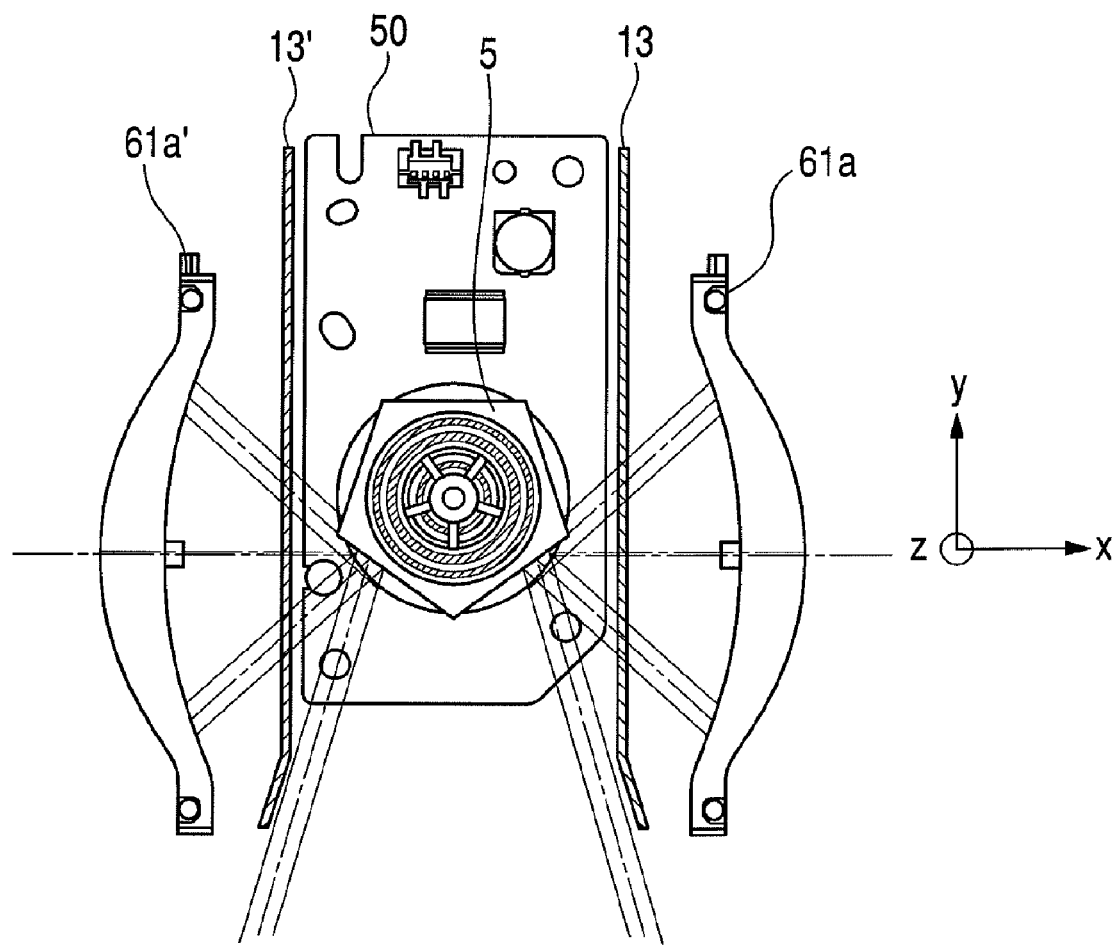

FIGS. 15A and 15B are main portion sectional diagrams of the conventional optical scanning apparatus. FIG. 15B illustrates a main-scanning section thereof, and FIG. 15A illustrates a sub-scanning section of FIG. 15B.

In FIGS. 15A and 15B, the following is set:
rp=17 mm
L=23 mm
A=42 mm

As illustrated in the conventional example of FIGS. 15A and 15B in which L is equal to or larger than the upper limit value of the conditional expression (1), opening widths W of undesirable-light blocking members 13 and 13' in the sub-scanning section are 3.64 mm. On the other hand, in this embodiment, by satisfying the conditional expression (1), as illustrated in FIG. 13A, the opening width W of the undesirable-light blocking member 12' in the sub-scanning section is 3.08 mm, and thus an undesirable light that has passed through the opening can be blocked without blocking a real light beam.

In the above-mentioned first and second embodiments, a light beam enters without any angle to the deflecting surface 5a of the rotational polygon mirror 5 in the sub-scanning section. On the other hand, as in the case of the third embodiment, when multiple light beams obliquely enter the same deflecting surface at different angles in the sub-scanning section, as illustrated in FIG. 14, an angle formed between both ends of multiple light beams in a sub-scanning section of a space between the rotational polygon mirror 5 and the imaging lens 61a is large. Thus, satisfying the conditional expression (1) further increases effects of narrowing an opening width W of the undesirable-light blocking member 12 in the sub-scanning section.

In order to facilitate manufacturing, the undesirable-light blocking member 12 and the optical box are made of plastic materials and integrally formed. In order to reduce rotational axis tilting of the rotational polygon mirror, the drive circuit substrate 50 for rotating and driving the rotational polygon mirror 5 is formed large.

Thus, in order to dispose the undesirable-light blocking member 12' approximately to the rotational axis of the rotational polygon mirror 5, as illustrated in FIGS. 13A and 13B, the drive circuit substrate 50 is disposed eccentric (displaced) in an optical axis direction of the imaging optical system with respect to the rotational axis of the rotational polygon mirror 5. Thus, disposition of the undesirable-light blocking member 12' is facilitated by satisfying the conditional expression (1).

Disposing the undesirable-light blocking members 12 and 12' in both sides of the rotational polygon mirror 5 interposed therebetween enables sure blocking of an unexpectedly generated undesirable light.

Thus, as described above, this embodiment enables effective blocking of an undesirable light in the opposed scanning units using the oblique incident optical system. As a result, this embodiment enables achievement of an optical scanning apparatus capable of obtaining high-quality images by a simple configuration without any deterioration in imaging performance of a color LBP or a color copying machine, and a color image forming apparatus.

Further, in this embodiment, the light sources 1a and 1b each include a single light emitting unit. However, the present invention is not limited to this, and the light sources 1a and 1b may include multiple light emitting units. In this embodiment, the imaging optical system 61 (61') includes two imaging optical elements (imaging lenses). However, the present invention is not limited to this, and the imaging optical system 61 (61') may include one, or three or more imaging optical elements.

Fourth Embodiment

Figure 16A:
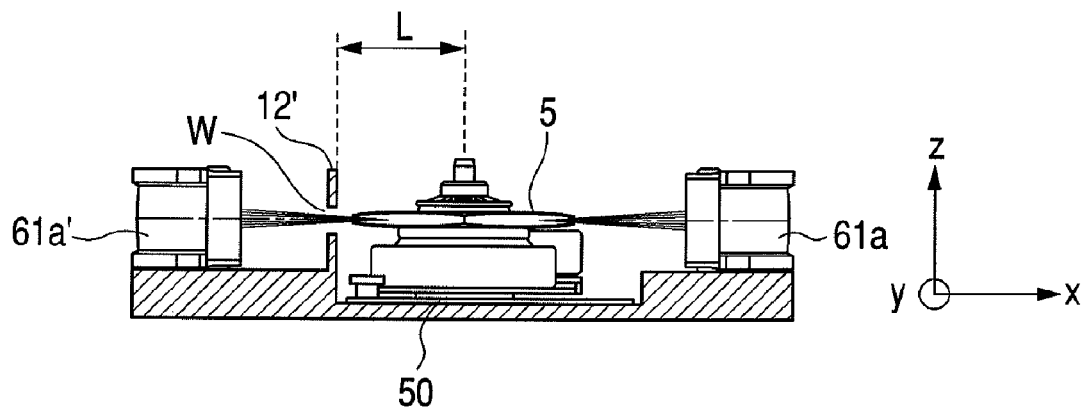
FIGS. 16A and 16B are main-scanning and sub-scanning sectional diagrams of an optical scanning apparatus according to a fourth embodiment of the present invention.
Figure 16B:
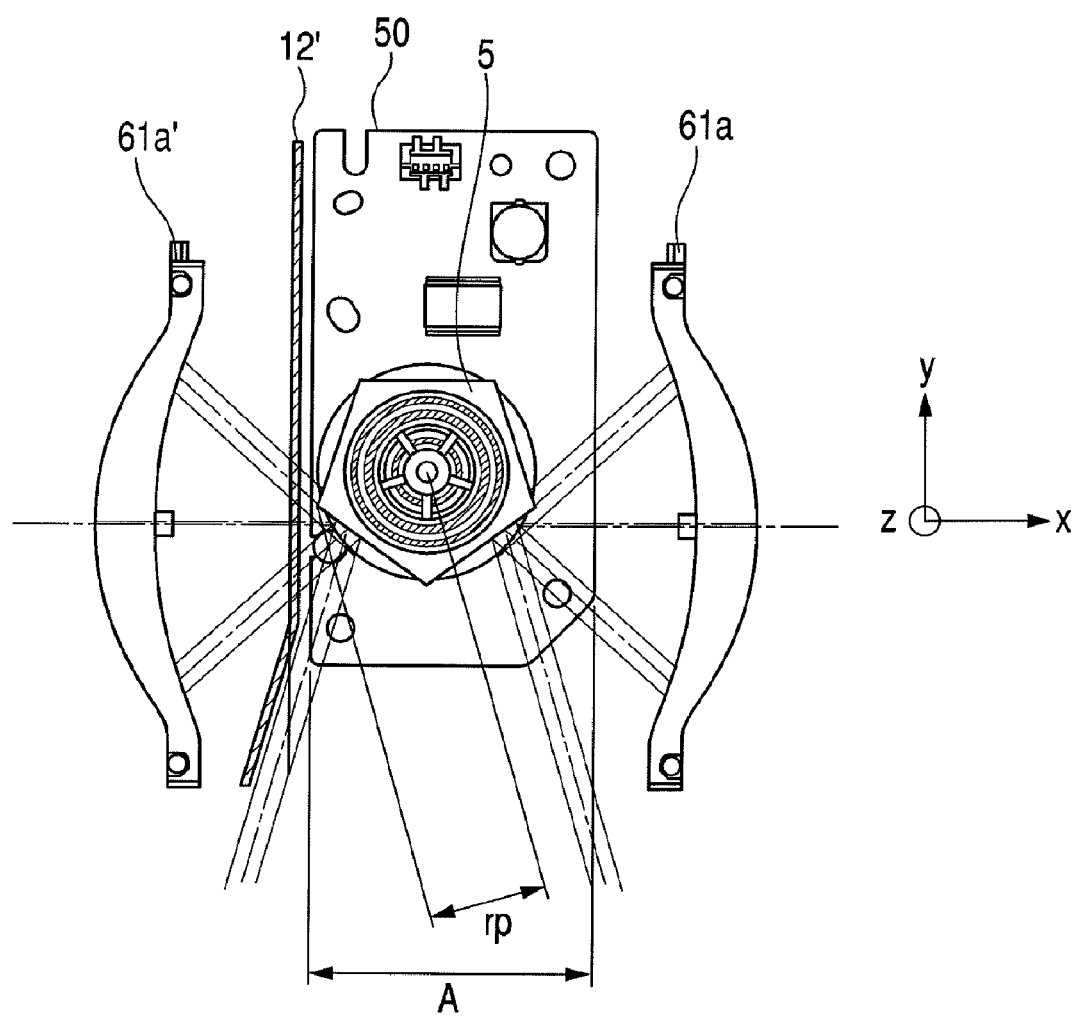

FIG. 16B illustrates a main-scanning section around a rotational polygon mirror according to a fourth embodiment of the present invention, and FIG. 16A illustrates a sub-scanning section of FIG. 16B. In FIGS. 16A and 16B, components similar to those illustrated in FIGS. 13A and 13B are denoted by similar reference numerals and symbols.

The fourth embodiment is different from the third embodiment in that an undesirable-light blocking member 12' is disposed only in one side (second scanning unit U2 side) with respect to a rotational polygon mirror 5. Other components and optical operations are similar to those of the third embodiment, and similar effects are accordingly obtained.

Specifically, this embodiment employs a configuration in which a drive circuit substrate 50 for rotating and driving the rotational polygon mirror 5 is disposed more eccentric with respect to a rotational axis of the rotational polygon mirror 5 to dispose the undesirable-light blocking member 12' closer to the rotational axis of the rotational polygon mirror 5, so that an opening width W in the sub-scanning section is set narrow. Thus, even when the undesirable-light blocking member 12' is disposed only in one side (second scanning unit U2 side) with respect to the rotational polygon mirror 5, an undesirable light can surely be blocked.

Formation of the undesirable-light blocking member 12' is facilitated. In a case where the undesirable-light blocking member 12' and an optical box are made of separate members without being integrally formed, the number of assembling steps is expected to be reduced.

In this embodiment, in order to satisfy the above-mentioned conditional expression (1), the circumcircle radius rp of the rotational polygon mirror 5, the distance L from a rotational center of the rotational polygon mirror 5 to the undesirable-light blocking member 12', and the length A of the drive circuit substrate 50 of the rotational polygon mirror 5 are set as follows:
rp=17 mm
L=19 mm
A=42 mm Those satisfy the conditional expression (1).

In this case, the opening width W of the undesirable-light blocking member 12' in the sub-scanning section is 2.28 mm, enabling blocking of undesirable lights without any problems.

In this embodiment, the undesirable-light blocking member is disposed in the scanning unit U2 side. However, the present invention is not limited to this, and the undesirable-light blocking member may be disposed in a scanning unit U1 side.

Fifth Embodiment

Figure 17A:
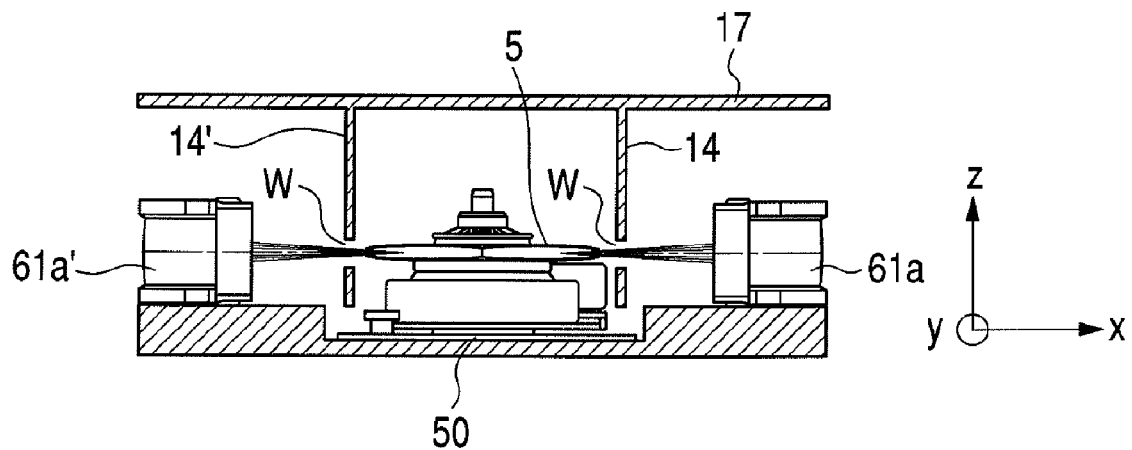
FIGS. 17A and 17B are main-scanning and sub-scanning sectional diagrams of an optical scanning apparatus according to a fifth embodiment of the present invention.
Figure 17B:
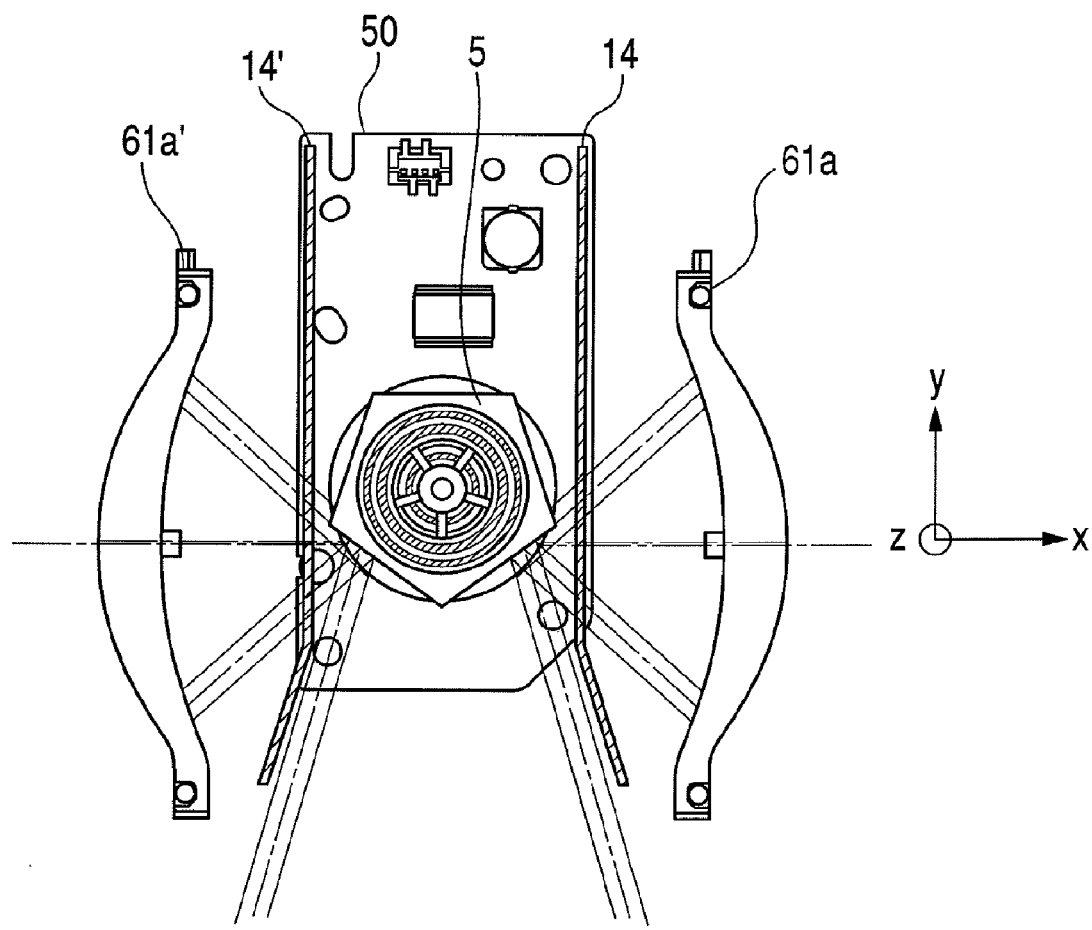

FIG. 17B illustrates a main-scanning section around a rotational polygon mirror according to a fifth embodiment of the present invention, and FIG. 17A illustrates a sub-scanning section of FIG. 17B. In FIGS. 17A and 17B, components similar to those illustrated in FIGS. 16A and 16B are denoted by similar reference numerals and symbols.

The fifth embodiment is different from the third embodiment in that undesirable-light blocking members 14 and 14' are integrally formed not with an optical box for housing an optical member but with a cap member 17 for closing the optical box. Other components and optical operations are similar to those of the third embodiment, and similar effects are obtained.

In FIG. 17A, the cap member 17 for closing the optical box is formed integrally with the undesirable-light blocking members 14 and 14'.

In this embodiment, integrally forming the undesirable-light blocking members 14 and 14' with the cap member 17 prevents interferences of the undesirable-light blocking members 14 and 14' with a drive circuit substrate 50 of a rotational polygon mirror 5. Thus, the undesirable-light blocking members 14 and 14' can be disposed close to a rotational axis of the rotational polygon mirror 5. Narrowing an opening width W of the undesirable-light blocking member 14' in a sub-scanning section enables sure blocking of undesirable lights without blocking a real light beam.

In this embodiment, the circumcircle radius rp of the rotational polygon mirror 5, the distance L from a rotational center of the rotational polygon mirror 5 to the undesirable-light blocking member 14', and the length A of the drive circuit substrate 50 of the rotational polygon mirror 5 are set as follows:

rp=17 mm
L=18.7 mm
A=42 mm

Those satisfy the conditional expression (1).

In this case, the opening width W of the undesirable-light blocking member 14' in the sub-scanning section is 3.03 mm, enabling blocking of undesirable lights without any problems.

(Image Forming Apparatus)

Figure 18:
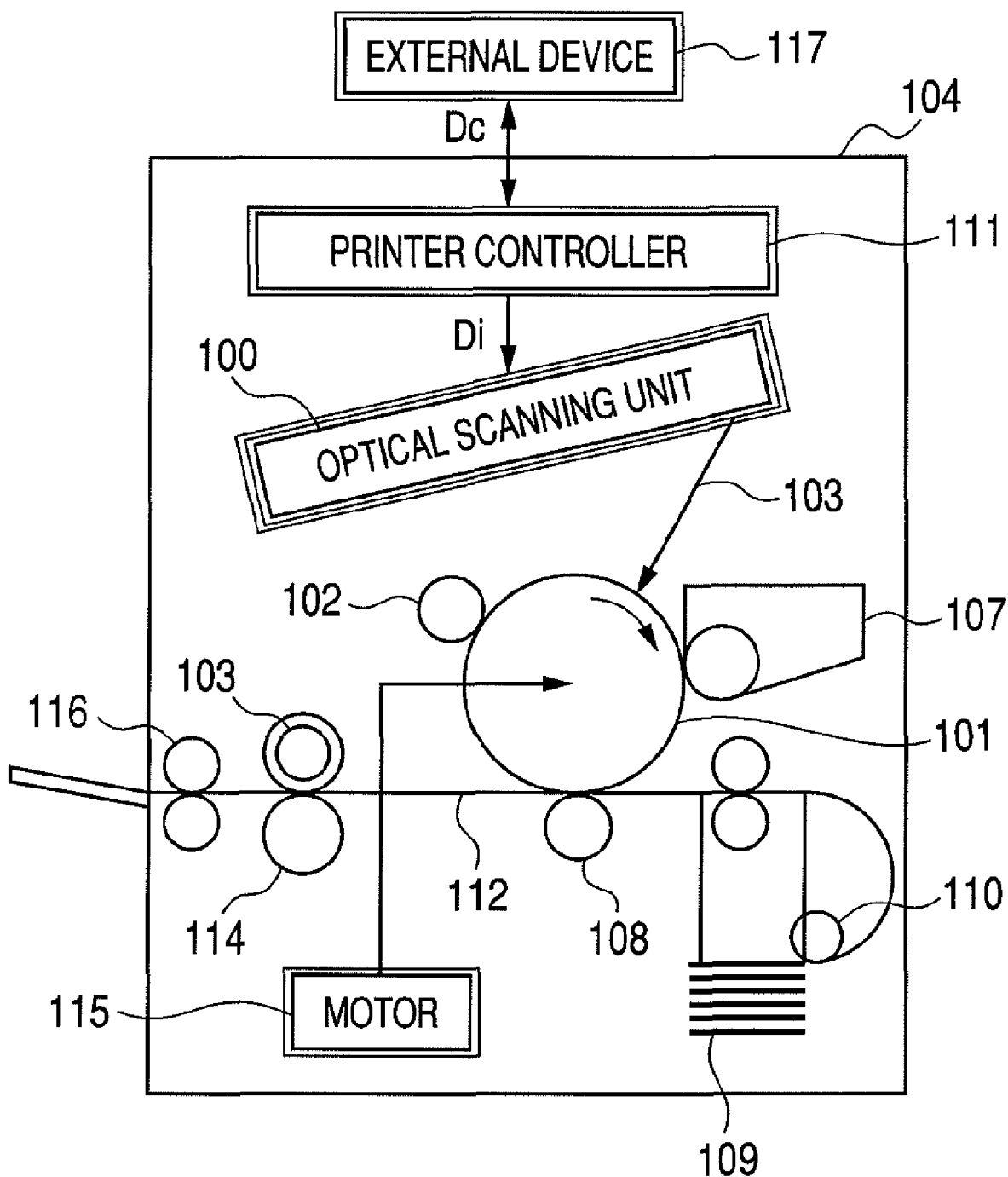
FIG. 18 is a main portion schematic diagram of an image forming apparatus according to an embodiment of the present invention.

FIG. 18 is a main portion sectional diagram in a sub-scanning direction, illustrating an image forming apparatus according to an embodiment of the present invention. Code data Dc is input from an external device 117 such as a personal computer to the image forming apparatus 104. The code data Dc is converted into image data (dot data) Di by a printer controller 111 in the image forming apparatus. The image data Di is input to an optical scanning unit 100 having the structure described in any one of the first to fifth embodiments. A light beam 103 modulated according to the image data Di is emitted from the optical scanning unit 100. A photosensitive surface of a photosensitive drum 101 is scanned with the light beam 103 in a main scanning direction.

The photosensitive drum 101 serving as an electrostatic latent image bearing member (photosensitive member) is rotated clockwise by a motor 115. With the rotation, the photosensitive surface of the photosensitive drum 101 is moved relatively to the light beam 103 in the sub-scanning direction orthogonal to the main scanning direction. A charging roller 102 for uniformly charging the surface of the photosensitive drum 101 is provided above the photosensitive drum 101 so as to be brought into contact with the surface thereof. The surface of the photosensitive drum 101 which is charged by the charging roller 102 is irradiated with the light beam 103 with which the optical scanning unit 100 scans.

As described above, the light beam 103 is modulated based on the image data Di. The surface of the photosensitive drum 101 is irradiated with the light beam 103 to form an electrostatic latent image thereon. The electrostatic latent image is developed as a toner image by a developing device 107 provided on the downstream side from the irradiation position of the light beam 103 in the rotational direction of the photosensitive drum 101 so as to be brought into contact with the photosensitive drum 101.

The toner image developed by the developing device 107 is transferred onto a sheet 112 serving as a transferring material by a transferring roller (transferring device) 108 provided below the photosensitive drum 101 so as to oppose to the photosensitive drum 101. The sheet 112 is contained in a sheet cassette 109 located in the front (right side in FIG. 18) of the photosensitive drum 101. The sheet 112 can be fed manually as well. A sheet feed roller 110 is provided in an end portion of the sheet cassette 109. The sheet 112 contained in the sheet cassette 109 is sent to a transport path by the sheet feed roller 110.

By the above-mentioned operation, the sheet 112 to which an unfixed toner image is transferred is further transported to a fixing device located in the rear (left side in FIG. 18) of the photosensitive drum 101. The fixing device is formed of a fixing roller 113 having a fixing heater (not shown) and a pressure roller 114 provided so as to be brought into press-contact with the fixing roller 113. The sheet 112 transported from the transferring part is heated while being pressurized in a press-contacting part between the fixing roller 113 and the pressure roller 114, and hence the unfixed toner image on the sheet 112 is fixed. A delivery roller 116 is provided in the rear of the fixing roller 113. The fixed sheet 112 is delivered to the outside of the image forming apparatus by the delivery roller 116.

Though not illustrated in FIG. 18, the printer controller 111 conducts not only data conversion described above but also control of each part of the image forming apparatus, which is represented by the motor 115, control of a polygon motor in the optical scanning unit as described later, and the like.

The recording density of the image forming apparatus which is used in the present invention is not particularly limited. When the recording density increases, higher image quality is required. Therefore, the structure according to the first to fifth embodiments of the present invention further exhibits an effect in the case of the image forming apparatus of 1,200 dpi or more.

(Color Image Forming Apparatus)

Figure 19:
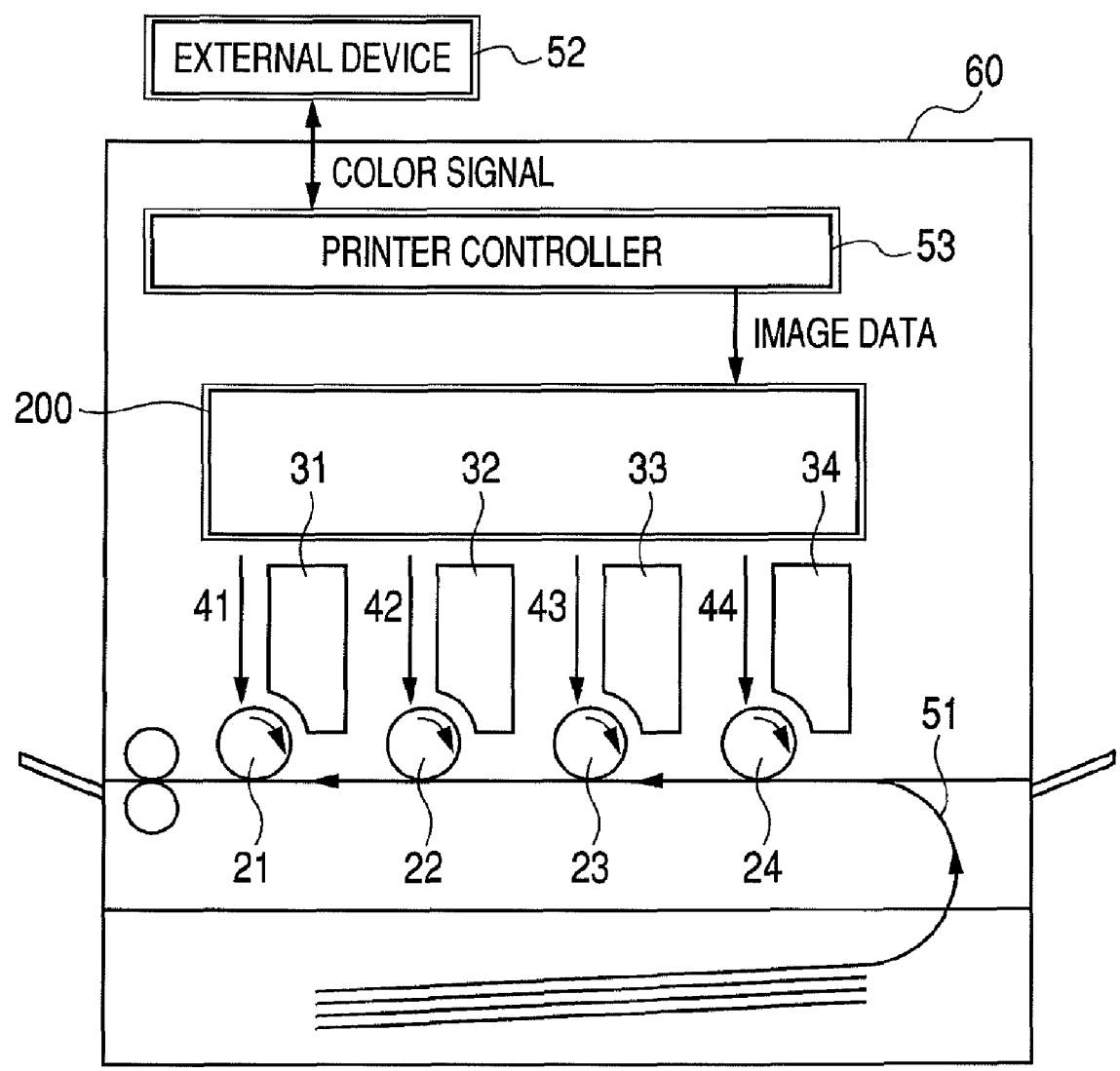
FIG. 19 is a main portion schematic diagram of a color image forming apparatus according to an embodiment of the present invention.
Figure 20:
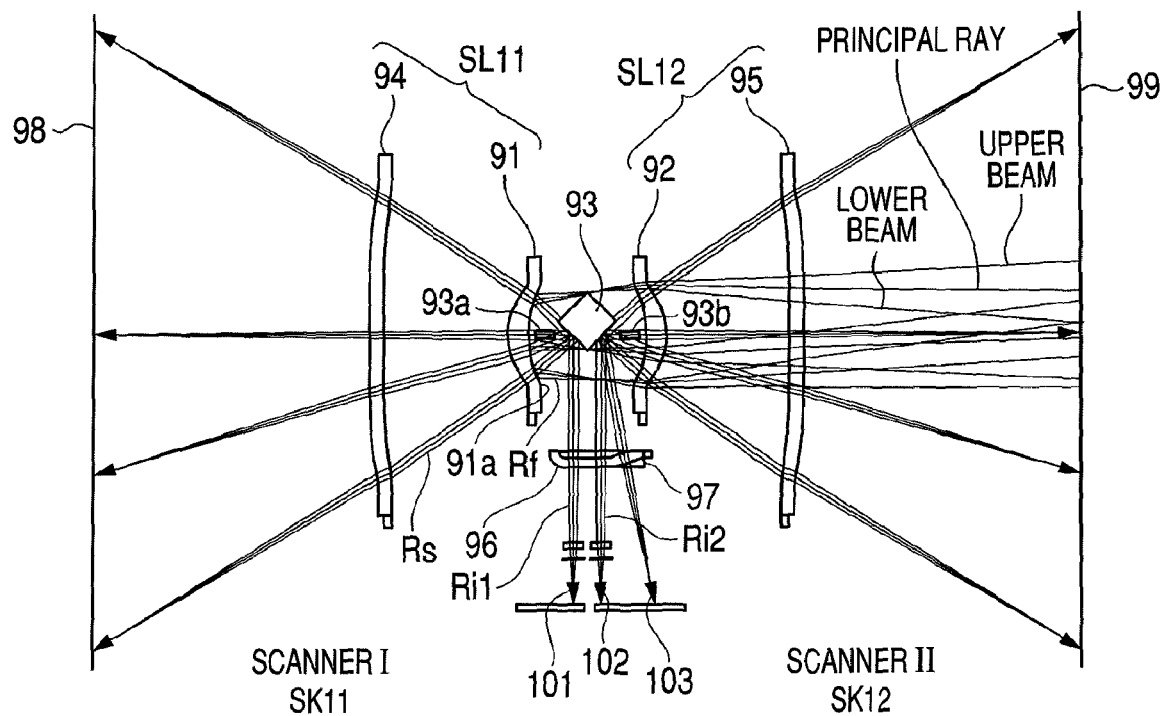
FIG. 20 is a main-scanning sectional diagram of a conventional optical scanning apparatus.
Figure 21:
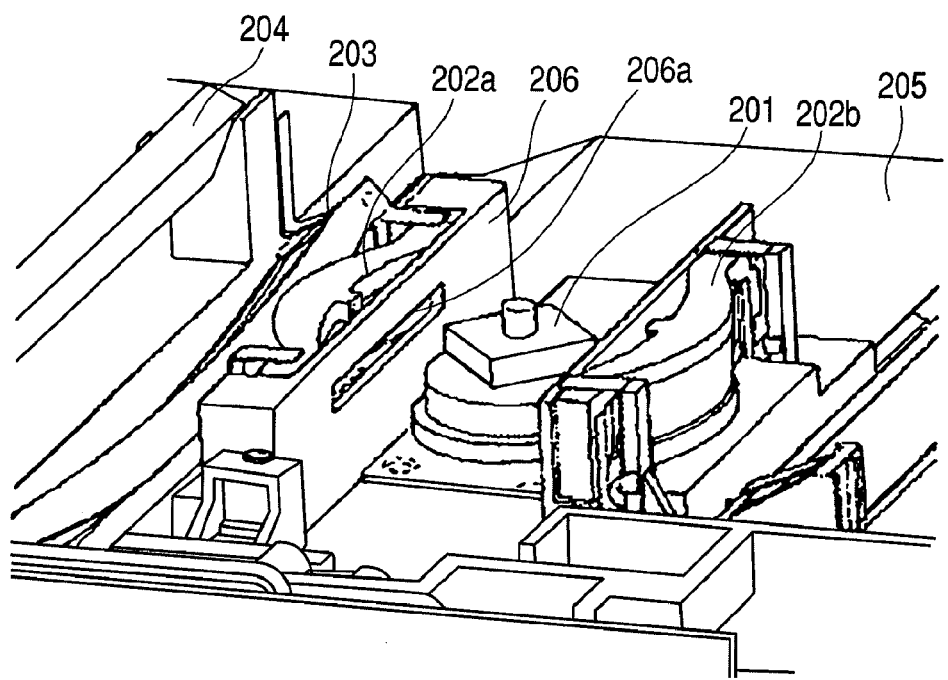
FIG. 21 is a sub-scanning sectional diagram of the conventional optical scanning apparatus.

FIG. 19 is a main portion schematic diagram illustrating a color image forming apparatus according to an embodiment of the present invention.

This embodiment describes a tandem type color image forming apparatus in which the scanning is performed with four beams by an optical scanning apparatus to record image information in parallel on photosensitive members each serving as an image bearing member. In FIG. 19, a color image forming apparatus 60 includes an optical scanning apparatus 200 having the structure described in any one of the first to fifth embodiments, photosensitive drums 21, 22, 23, and 24 each serving as an image bearing member, developing devices 31, 32, 33, and 34, and a transport belt 51.

In FIG. 19, respective color signals of red (R), green (G), and blue (B) are input from an external device 52 such as a personal computer to the color image forming apparatus 60. The color signals are converted into pieces of image data (dot data) of yellow (Y), magenta (M), cyan (C), and black (B) by a printer controller 53 in the color image forming apparatus. The pieces of image data are input to the optical scanning apparatus 200. Light beams 41, 42, 43, and 44 which are modulated according to the respective pieces of image data are emitted from the optical scanning apparatus 200. The photosensitive surfaces of the photosensitive drums 21, 22, 23, and 24 are scanned with the light beams in a main scanning direction.

According to the color image forming apparatus in this embodiment, the optical scanning apparatus 200 scans with the four beams which respectively correspond to the respective colors of yellow (Y), magenta (M), cyan (C), and black (B). The image signals (image information) are recorded in parallel on the surfaces of the photosensitive drums 21, 22, 23, and 24, thereby printing a color image at high speed.

According to the color image forming apparatus in this embodiment, as described above, latent images of the respective colors are formed on the corresponding surfaces of the photosensitive drums 21, 22, 23, and 24 using the light beams based on the respective pieces of image data by the scanning optical device 200. After that, the multi-transfer is performed on a recording material to produce a full color image.

For example, a color image reading apparatus including a CCD sensor may be used as the external device 52. In this case, the color image reading apparatus and the color image forming apparatus 60 constitute a color digital copying machine.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-122211, filed May 8, 2008, which is hereby incorporated by reference herein in its entirety.

What is claimed is:

1. An optical scanning apparatus, comprising:
    a first scanning unit and a second scanning unit facing each other with a rotational polygon mirror interposed therebetween in a sub-scanning section, the first scanning unit and the second scanning unit each including:
    an incident optical system in which a light beam emitted from a light source is made incident on a deflecting surface of the rotational polygon mirror; and
    an imaging optical system including an imaging optical element configured to cause the light beam, deflected for scanning on the deflecting surface of the rotational polygon mirror, form an image on a surface to be scanned,
    wherein the light beam that enters the deflecting surface of the rotational polygon mirror enters obliquely with respect to a normal of the deflecting surface of the rotational polygon mirror in the sub-scanning section,
    wherein the first scanning unit includes an undesirable-light blocking member configured to block an undesirable light reflected on an optical surface of the imaging optical element of the second scanning unit to travel toward the surface to be scanned of the first scanning unit,
    wherein the following condition is satisfied:

$rp < L \leq A/2$ where rp denotes a circumcircle radius of the rotational polygon mirror, L denotes a distance from a rotational center of the rotational polygon mirror to the undesirable-light blocking member of the first scanning unit in a direction of an optical axis of the imaging optical system, and A denotes a length of a drive circuit substrate for driving the rotational polygon mirror in the direction of the optical axis of the imaging optical system,
    wherein the undesirable-light blocking member is integrally formed with an optical box in which the drive circuit substrate is fixed, and
    wherein the second scanning unit includes an undesirable-light blocking member configured to block an undesirable light reflected on an optical surface of the imaging optical element of the first scanning unit to travel toward a surface to be scanned of the second scanning unit,
    wherein the following condition is satisfied:

$A/2 < L'$ where L' denotes a distance from the rotational center of the rotational polygon mirror to the undesirable-light blocking member of the second scanning unit in the direction of the optical axis of the imaging optical system, and
    wherein an opening width of the undesirable-light blocking member of the first scanning unit in a sub-scanning direction is narrower than an opening width of the undesirable-light blocking member of the second scanning unit in the sub-scanning direction.

2. An optical scanning apparatus according to claim 1, wherein the first scanning unit and the second scanning unit each includes two stations, and a light beam emitted from a light source of each of the two stations is incident obliquely with respect to the normal of the deflecting surface of the rotational polygon mirror in the sub-scanning section.

3. An optical scanning apparatus according to claim 2, wherein the light beams emitted from the light sources of the two stations enter the same deflecting surface of the rotational polygon mirror in the sub-scanning section.

4. An optical scanning apparatus according to claim 3, wherein the light beams deflected for scanning on the same deflecting surface of the rotational polygon mirror pass through the imaging optical element shared by the two stations.

5. An image forming apparatus, comprising:
    the optical scanning apparatus according to claim 1;
    a photosensitive member disposed on a surface to be scanned;
    a developing device configured to develop an electrostatic latent image formed on the photosensitive member by scanning with a light beam by the optical scanning apparatus as a toner image;
    a transferring device configured to transfer the developed toner image to a transfer material; and
    a fixing device configured to fix the transferred toner image on the transfer material.

6. An image forming apparatus, comprising:
    the optical scanning apparatus according to claim 1; and
    a printer controller configured to convert code data input from an external device into an image signal, and to input the converted image signal to the optical scanning apparatus.

* * * * *